(12) United States Patent
Suga

(10) Patent No.: US 9,086,618 B2
(45) Date of Patent: Jul. 21, 2015

(54) PROJECTOR HAVING HOLOGRAPHIC RECORDING MEDIUM AND LIGHT MODULATION ELEMENT

(75) Inventor: Akinobu Suga, Tokyo (JP)

(73) Assignee: Nikon Corporation, Tokyo (JP)

( * ) Notice: Subject to any disclaimer, the term of this patent is extended or adjusted under 35 U.S.C. 154(b) by 208 days.

(21) Appl. No.: 13/492,742

(22) Filed: Jun. 8, 2012

(65) Prior Publication Data

US 2012/0314115 A1    Dec. 13, 2012

(30) Foreign Application Priority Data

Jun. 10, 2011  (JP) ................................. 2011-130065
Jun. 10, 2011  (JP) ................................. 2011-130066
May 22, 2012  (JP) ................................. 2012-116231

(51) Int. Cl.
   *G03B 21/20*    (2006.01)
   *G03H 1/04*     (2006.01)
   (Continued)

(52) U.S. Cl.
   CPC .............. *G03B 21/20* (2013.01); *G03B 21/208* (2013.01); *G03B 21/2033* (2013.01);
   (Continued)

(58) Field of Classification Search
   CPC .. G03B 21/00; G03B 21/2033; G03B 21/204; G03B 21/208; G03B 21/2093; G03B 21/53; G03B 33/06; G03B 33/08; G03B 33/10; G03B 21/20; G03B 21/2066; G02B 5/32; G02B 5/203; G02B 6/32; G02B 7/28; G02B 7/282; G02B 27/48; H04N 5/89; H04N 9/3152; H04N 9/3158; H04N 9/3161; G03H 1/04; G03H 1/0443; G03H 1/22; G03H 1/2205; G03H 1/32

USPC ................. 353/94, 122, 97, 101; 348/40–41, 348/333.1; 359/3, 10–11, 15, 17, 19, 27, 359/30–33, 205.1, 648–651, 684, 693–694, 359/698, 705, 823

See application file for complete search history.

(56) References Cited

U.S. PATENT DOCUMENTS 7,486,424 B2 *  2/2009  Kanaoka et al. ................. 359/22
8,007,133 B2 *  8/2011  Yamauchi et al. ............. 362/277
(Continued)

FOREIGN PATENT DOCUMENTS

JP    03-296031 A    12/1991
JP    05-015036 U    2/1993
(Continued)

OTHER PUBLICATIONS

Office Action issued Apr. 23, 2013, in Japanese Patent Application No. 2011-130065.
(Continued)

*Primary Examiner* — Jori S Reilly-Diakun
(74) *Attorney, Agent, or Firm* — Miles & Stockbridge P.C.

(57) ABSTRACT

A projector includes: a laser light source that emits laser light; a condensing optical system that collimates the laser light; a holographic recording medium that, when laser light for reproduction is incident thereupon, emits a reproduced holographic optical image on the basis of a holographic image; a light modulation element that modulates the reproduced holographic optical image and emits the result to a projection optical system as an optical image for projection; a projection optical system that projects the optical image for projection; and a focal depth adjustment unit that adjusts a focus depth of the ray bundle projected by the projection optical system.

14 Claims, 24 Drawing Sheets

(51) Int. Cl.
  *G03H 1/22* (2006.01)
  *G03H 1/32* (2006.01)
  *H04N 9/31* (2006.01)
  *G03B 17/54* (2006.01)
  *G02B 27/48* (2006.01)
  *G03B 21/53* (2006.01)

(52) U.S. Cl.
  CPC ......... *G03B 21/2093* (2013.01); *G03H 1/0443* (2013.01); *G03H 1/2205* (2013.01); *G03H 1/32* (2013.01); *H04N 9/3161* (2013.01); *G02B 27/48* (2013.01); *G03B 17/54* (2013.01); *G03B 21/204* (2013.01); *G03B 21/2066* (2013.01); *G03B 21/53* (2013.01); *G03H 2210/20* (2013.01); *G03H 2223/12* (2013.01); *G03H 2223/54* (2013.01); *G03H 2227/02* (2013.01); *G03H 2227/03* (2013.01); *H04N 9/3185* (2013.01); *H04N 9/3194* (2013.01)

(56) References Cited

U.S. PATENT DOCUMENTS

| | | | | |
|---|---|---|---|---|
| 8,335,028 | B2 * | 12/2012 | Renaud-Goud | 359/32 |
| 8,498,035 | B2 * | 7/2013 | Kurashige | 359/21 |
| 8,531,747 | B2 * | 9/2013 | Matsubara et al. | 359/15 |
| 8,649,077 | B2 * | 2/2014 | Kihara et al. | 359/12 |
| 8,663,873 | B2 * | 3/2014 | Burns et al. | 430/2 |
| 8,699,109 | B2 * | 4/2014 | Kurashige et al. | 359/10 |
| 8,727,543 | B2 | 5/2014 | Kurashige et al. | |
| 2009/0168424 | A1 | 7/2009 | Yamauchi et al. | |
| 2010/0165297 | A1 * | 7/2010 | Mizushima et al. | 353/30 |
| 2011/0109948 | A1 * | 5/2011 | Cable | 359/9 |
| 2012/0044553 | A1 | 2/2012 | Kurashige | |
| 2012/0182307 | A1 | 7/2012 | Ueno et al. | |
| 2013/0170007 | A1 * | 7/2013 | Kurashige et al. | 359/24 |
| 2014/0043591 | A1 * | 2/2014 | Kurashige et al. | 353/85 |

FOREIGN PATENT DOCUMENTS

| | | | |
|---|---|---|---|
| JP | 09-318907 | A | 12/1997 |
| JP | 11-095164 | A | 4/1999 |
| JP | 2002-162573 | A | 6/2002 |
| JP | 2002-268136 | A | 9/2002 |
| JP | 2003-302578 | A | 10/2003 |
| JP | 2005-070687 | A | 3/2005 |
| JP | 2005-084100 | A | 3/2005 |
| JP | 2005-091606 | A | 4/2005 |
| JP | 2005-353250 | A | 12/2005 |
| JP | 2007-114358 | A | 5/2007 |
| JP | 2007-264554 | A | 10/2007 |
| JP | 2008-076582 | A | 4/2008 |
| JP | 2008-257242 | A | 10/2008 |
| JP | 2008-262029 | A | 10/2008 |
| JP | 2008-292570 | A | 12/2008 |
| JP | 2009-162825 | A | 7/2009 |
| JP | 2009-206800 | A | 9/2009 |
| JP | 4378865 | B2 | 10/2009 |
| JP | 2010-197916 | A | 9/2010 |
| JP | 4688980 | B1 | 5/2011 |
| WO | WO 2008/088001 | A1 | 7/2008 |
| WO | WO 2011/037237 | A1 | 3/2011 |

OTHER PUBLICATIONS

Office Action issued Apr. 16, 2015, in Chinese Patent Application No. 201210195589.6.

* cited by examiner

ELEVATION VIEW

PLAN VIEW

ELEVATION VIEW

PLAN VIEW

PROJECTOR HAVING HOLOGRAPHIC RECORDING MEDIUM AND LIGHT MODULATION ELEMENT

INCORPORATION BY REFERENCE

The disclosures of the following priority applications are herein incorporated by reference: Japanese Patent Application No. 2011-130065 filed Jun. 10, 2011, Japanese Patent Application No. 2011-130066 filed Jun. 10, 2011, and Japanese Patent Application No. 2012-116231 filed May 22, 2012.

BACKGROUND OF THE INVENTION

1. Field of the Invention

The present invention relates to a projector and an image capturing apparatus.

2. Description of Related Art

Inventions of various types have been disclosed in which laser light is utilized as the light source for a projector. The merit of using laser light as the light source for a projector is that it becomes possible to perform projection with a great degree of focusing freedom, since it is possible to obtain very large focusing depth. On the other hand, the demerit of using laser light as the light source for a projector is that speckle noise occurs, and sometimes this exerts a negative influence upon the projected image.

In the past, there was a method of projection, including vibrating a holographic recording medium, increasing the diameter of a ray bundle of laser light that is incident upon this holographic recording medium, irradiating the reproduced hologram optical image upon a light modulation element, and projecting the resulting image. With this method, speckle noise is almost perfectly eliminated, due to the fact that the holographic recording medium is vibrated, and due to the fact that the projection numerical aperture is made larger by increasing the diameter of the laser light ray bundle. It should be noted that, there was no disclosure regarding the position of the entrance pupil of the projection optical system (for example, refer to Japanese Laid-Open Publication 2010-197916).

SUMMARY OF THE INVENTION

Depending upon the environment in which the projector is used, in some cases more importance is attached to freedom in focusing, and in some cases more importance is attached to reduction of speckle noise. While, with the invention of Patent Document #1, it is possible to cope with the case in which the reduction of speckle noise is to be emphasized, it is not possible to cope with the case in which freedom in focusing is to be emphasized.

The object of the present invention is, using a holographic recording medium, to project an optical image with a projection optical system included in a projector without any vignetting. And another object of the present invention is to enhance freedom in focusing.

According to the first aspect of the present invention, a projector, comprising: a laser light source that emits laser light; a condensing optical system that collimates the laser light; a holographic recording medium that, when laser light for reproduction is incident thereupon, emits a reproduced holographic optical image on the basis of a holographic image; a light modulation element that modulates the reproduced holographic image and emits the result to a projection optical system as an optical image for projection; and a focus depth adjustment unit that adjusts a focus depth of the ray bundle projected by the projection optical system.

According to the second aspect of the present invention, in the projector of the first aspect, it is preferred that, wherein the focus depth adjustment unit adjusts the focus depth of the ray bundle projected by the projection optical system by adjusting the projection numerical aperture of the reproduced holographic optical image.

According to the third aspect of the present invention, in the projector of the second aspect, it is preferred that, wherein the focus depth adjustment unit comprises a magnifying optical system that is capable of increasing the diameter of the ray bundle of laser light collimated by the condensing optical system, and the projection numerical aperture of the reproduced holographic optical image is adjusted by inserting and removing the magnifying optical system into and from the optical path of the laser light collimated by the condensing optical system.

According to the fourth aspect of the present invention, in the projector of the third aspect, it is preferred that, wherein the focus depth adjustment unit further comprises a reduction optical system that is capable of reducing the diameter of the ray bundle of laser light collimated by the condensing optical system, and the reduction optical system is inserted into the optical path of the laser light collimated by the condensing optical system when the magnifying optical system has been removed from that optical path.

According to the fifth aspect of the present invention, in the projector of the second aspect, it is preferred that, wherein the focus depth adjustment unit further comprises an iris member at the light source side of the holographic recording medium or at its rear surface side, and the projection numerical aperture of the reproduced holographic optical image is adjusted by reducing the diameter of the ray bundle of the reproduced holographic optical image in correspondence with the diameter of the ray bundle of the laser light for reproduction, or with the laser light for reproduction.

According to the sixth aspect of the present invention, in the projector of the second aspect, it is preferred that, wherein the focus depth adjustment unit further comprises a scanning optical system that scans the holographic recording medium with a reflected light bundle consisting of laser light collimated by the condensing optical system and reflected, and the projection numerical aperture of the reproduced holographic optical image is adjusted by adjusting the angular range over which laser light is reflected when the scanning optical system scans the holographic recording medium.

According to the seventh aspect of the present invention, in the projector of the sixth aspect, it is preferred that, wherein the scanning optical system is a MEMS mirror.

According to the eighth aspect of the present invention, in the projector of the first aspect, it is preferred that, wherein the projection optical system has an entrance pupil radius at a position that approximately coincides with the position of the exit surface where the holographic recording medium emits the reproduced holographic optical image.

According to the ninth aspect of the present invention, in the projector of the eighth aspect, it is preferred that, wherein the projection optical system has an entrance pupil radius such that it is capable of projecting, with no vignetting, an optical image for projection corresponding to the reproduced holographic optical image emitted from the entire area of the holographic recording medium.

According to the tenth aspect of the present invention, in the projector of the first aspect, it is preferred that, wherein the reproduced holographic optical image is capable of irradiating the entire area of the image display region.

According to the eleventh aspect of the present invention, in the projector of the first aspect, it is preferred that, further comprising a speckle noise reduction means that reduces speckle noise by vibrating the holographic recording medium.

According to the twelfth aspect of the present invention, a projector, comprising: a laser light source that emits laser light; a light modulation element that modulates a ray bundle emitted from the laser light source and emits it as a projected optical image;

a projection unit that comprises a projection optical system, and that projects a projected optical image that is incident upon the projection optical system from the light modulation element; a selection unit that selects a focus depth for projecting of the optical image from a plurality of focus depths that are determined in advance; and a changeover unit that changes over the incident numerical aperture of the ray bundle incident upon the light modulation element, according to the focal depth selected by the selection unit.

According to the thirteenth aspect of the present invention, in the projector of the twelfth aspect, it is preferred that, wherein the plurality of focus depths that are determined in advance include a first focus depth and a second focus depth that is deeper than the first focus depth.

According to the fourteenth aspect of the present invention, in the projector of the thirteenth aspect, it is preferred that, further comprising a stationary determination unit that determines whether or not a body of the projector is stationary; and wherein the selection unit selects the first focus depth when the stationary determination unit has determined that the body of the projector is stationary, and selects the second focus depth when the stationary determination unit has determined that the body of the projector is not stationary.

According to the fifteenth aspect of the present invention, in the projector of the thirteenth aspect, it is preferred that, further comprising: a range finding unit that measures the distance to a screen upon which the optical image for projection is projected; and a focus adjustment unit that adjusts the focal point of the projection system on the basis of the distance to the screen.

According to the sixteenth aspect of the present invention, in the projector of the fifteenth aspect, it is preferred that, wherein the selection unit selects the second focus depth when the width of variation of the distance measured by the range finding unit during an interval of a predetermined duration is greater than the first focus depth, and selects the first focus depth when the width of variation is less than the first focus depth.

According to the seventeenth aspect of the present invention, in the projector of the fifteenth aspect, it is preferred that, wherein: the range finding unit comprises a plurality of range finders each of which measures the distance to the screen; and the selection unit selects the second focus depth when the difference of the distances to the screen measured by each of the plurality of range finders is greater than a predetermined value, and selects the first focus depth when the difference of the distances is less than the predetermined value.

According to the eighteenth aspect of the present invention, in the projector of the twelfth aspect, it is preferred that, further comprising a curvature determination unit that determines whether or not a screen upon which the projected optical image is projected has a curved surface; and wherein the selection unit selects the second focal depth if the curvature determination unit has determined that the screen has a curved surface, and selects the first focal depth if the curvature determination unit has determined that the screen does not have a curved surface.

According to the nineteenth aspect of the present invention, in the projector of the eighteenth aspect, it is preferred that, further comprising an image capturing unit that captures an image of the screen and outputs a captured image; and wherein the curvature determination unit determines that the screen has a curved surface on the basis of an image of the screen upon which a predetermined image has been projected captured and output by the image capturing unit, and a photographic image photographed by the image capturing unit.

According to the twentieth aspect of the present invention, in the projector of the nineteenth aspect, it is preferred that, further comprising a screen change detection unit that detects change of the screen on the basis of the captured image; and wherein the selection unit selects the second focal depth when the screen change detection unit has detected change of the screen.

According to the twenty-first aspect of the present invention, in the projector of the twelfth aspect, it is preferred that, wherein an entrance pupil position of the projection optical system is positioned more towards the light source side than the light modulation element on the optical axis.

According to the twenty-second aspect of the present invention, in the projector of the twelfth aspect, it is preferred that, further comprising a holographic recording medium that, when laser light for reproduction is incident thereupon, emits a reproduced holographic optical image on the basis of a holographic image, wherein a reproduced holographic optical image emitted from the holographic recording medium is entered into the light modulation element and modulated by the light modulation element.

According to the twenty-third aspect of the present invention, an image capturing apparatus, comprising a projector according to any one of aspects 1 through 22.

According to the twenty-fourth aspect of the present invention, a projector, comprising: a laser light source that emits laser light; a condensing optical system that collimates the laser light; a holographic recording medium that, when laser light for reproduction is incident thereupon, emits a reproduced holographic optical image on the basis of a holographic image; a light modulation element that modulates the reproduced holographic image and emits the result to a projection optical system as an optical image for projection; and a projection optical system that projects the optical image for projection; wherein the projection optical system has an entrance pupil at a position that approximately coincides with the position of the exit surface where the holographic recording medium emits the reproduced holographic optical image.

DESCRIPTION OF PREFERRED EMBODIMENTS

The projector according to the present invention has a plurality of projection modes whose focus depths are different, and is able to change over between these projection modes, as appropriate according to the state of use. For example, when the projector is being used in the firmly seated state by being placed upon a desk or fixed upon a tripod, then the projector is set to the shallow focus depth projection mode in which the projection numerical aperture is large, since it is sufficient to perform focus adjustment at the initial stage. On the other hand, when the projector is being used in the handheld state, then the projector is set to the deep focus depth projection mode in which the projection numerical aperture is small, since it is considered that the distance relationship with the screen may change.

—Embodiment #1—

Figure 1:
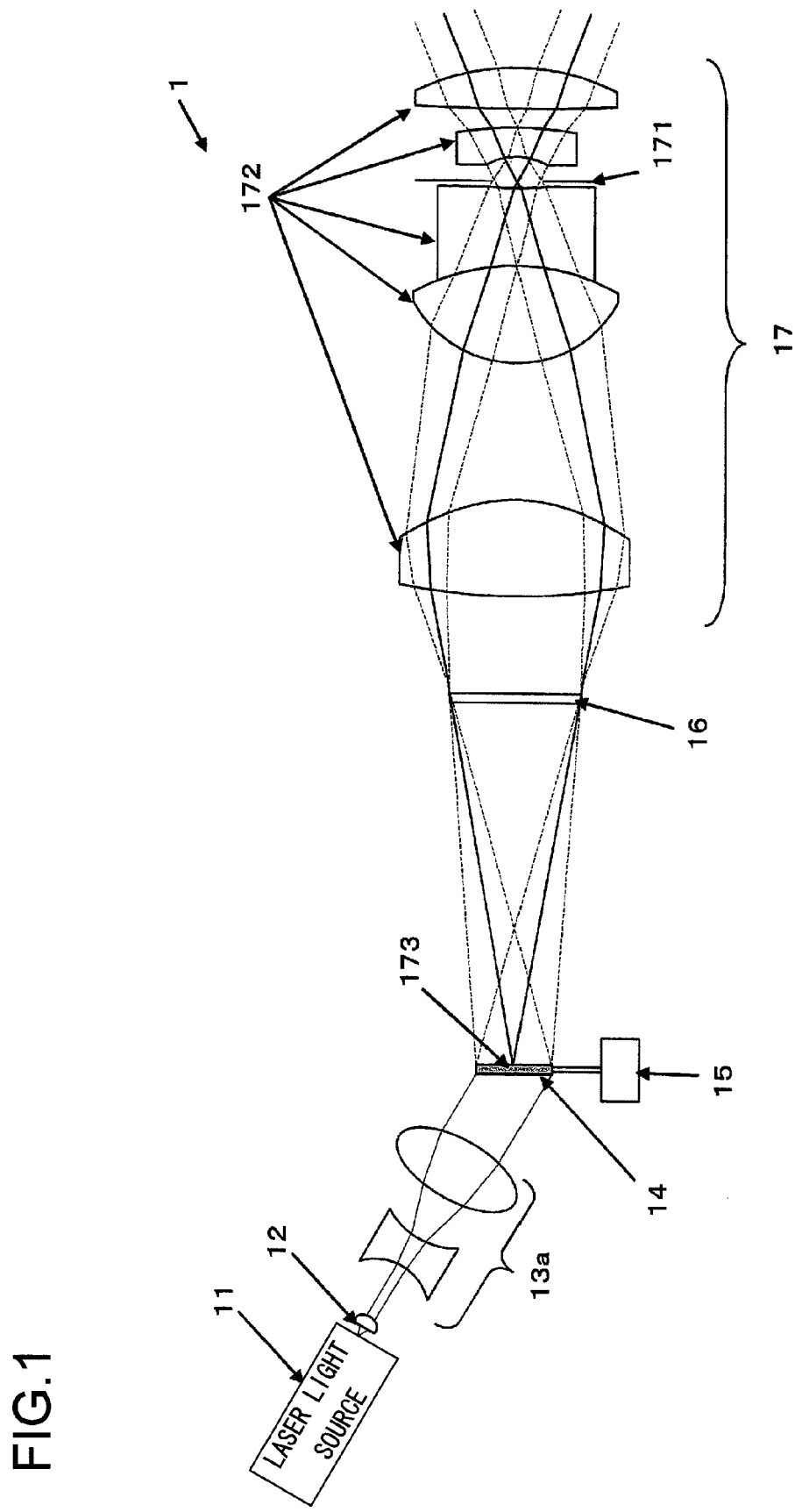
FIG. 1 is a schematic diagram showing an example of the structure of a projector according to a first embodiment of the present invention, in one state thereof.

FIG. 1 is a schematic diagram showing an example of the structure of a projector according to the first embodiment of the present invention. The projector 1 shown in FIG. 1 includes a laser light source 11, a condensing optical system 12, a magnifying optical system 13a, a holographic recording medium 14, a vibration element 15, a light modulation element 16, and a projection optical system 17. While only one laser light source 11 is shown in FIG. 1, it would also be acceptable to provide a plurality of laser light sources.

The condensing optical system 12 collimates laser light emitted from the laser light source 11. And the magnifying optical system 13a increases the diameter of this ray bundle of collimated light, and emits it towards the holographic recording medium 14 as laser light for reproduction. The magnifying optical system 13a can be inserted into the optical path of the collimated light or removed therefrom, and, in the state shown in FIG. 2 in which the magnifying optical system 13a is removed from the optical path of the collimated light, the ray bundle of collimated light is emitted towards the holographic recording medium 14 as laser light for reproduction without its diameter being increased.

The holographic recording medium 14 is a holographic type optical information recording and reproduction medium that employs a transmission type double ray bundle interference method. A diffused planar holographic image having a rectangular shape is recorded at many points on this holographic recording medium 14. When a region on the holographic recording medium 14 receives laser light for reproduction, it emits a reproduced holographic optical image towards the light modulation element 16. The vibration element 15 vibrates the holographic recording medium 14, and thereby causes the reproduced holographic optical image that is emitted to change over time.

The light modulation element 16 is a transmission type spatial light modulator. This light modulation element 16 has an image modulation region, and the reproduced holographic optical image emitted from the holographic recording medium 14 is modulated by this image modulation region, and is transmitted through it towards the projection optical system 17 as an optical image for projection. This optical image for projection is then projected upon a screen via the projection optical system 17.

The holographic optical image that is emitted from many points upon the holographic recording medium 14 is able to irradiate the entire image modulation region of the light modulation element 16. This reproduced holographic optical image that is emitted from many points upon the holographic recording medium 14 is superimposed upon the light modulation element 16. Even if the diameter of the ray bundle of the laser light for reproduction that is incident upon the holographic recording medium 14 changes, the amount of light in the reproduced holographic optical image that falls upon the light modulation element 16 does not change.

The projection optical system 17 includes an aperture iris 171 and a plurality of projection lenses 172. The entrance pupil position of the projection optical system 17 is positioned more towards the light source side than the light modulation element 16, and approximately coincides with the position 173 of the exit surface of the reproduced holographic optical image.

Due to the magnification of the diameter of the ray bundle of collimated light with the magnifying optical system 13a as shown in FIG. 1, the projection numerical aperture of the reproduced holographic optical image emitted from the holographic recording medium 14 becomes larger. As a result, the range of angles of incidence upon the light modulation element 16 of the reproduced holographic optical image is multiplexed, and furthermore the range of angles of incidence upon the screen of the optical image for projection is multiplexed. Due to this, the level of speckle noise is reduced. Moreover, by the vibration element 15 vibrating the holographic recording medium 14, the optical image for projection that is projected upon the screen also changes over time. Due to this, the level of speckle noise is further reduced.

On the other hand, in the projector 1, the projection numerical aperture of the reproduced holographic optical image becomes larger due to the diameter of the ray bundle of the laser light for reproduction being magnified by the magnification optical system 13a. Due to this, the focus depth of this optical image for projection becomes shallower.

Figure 2:
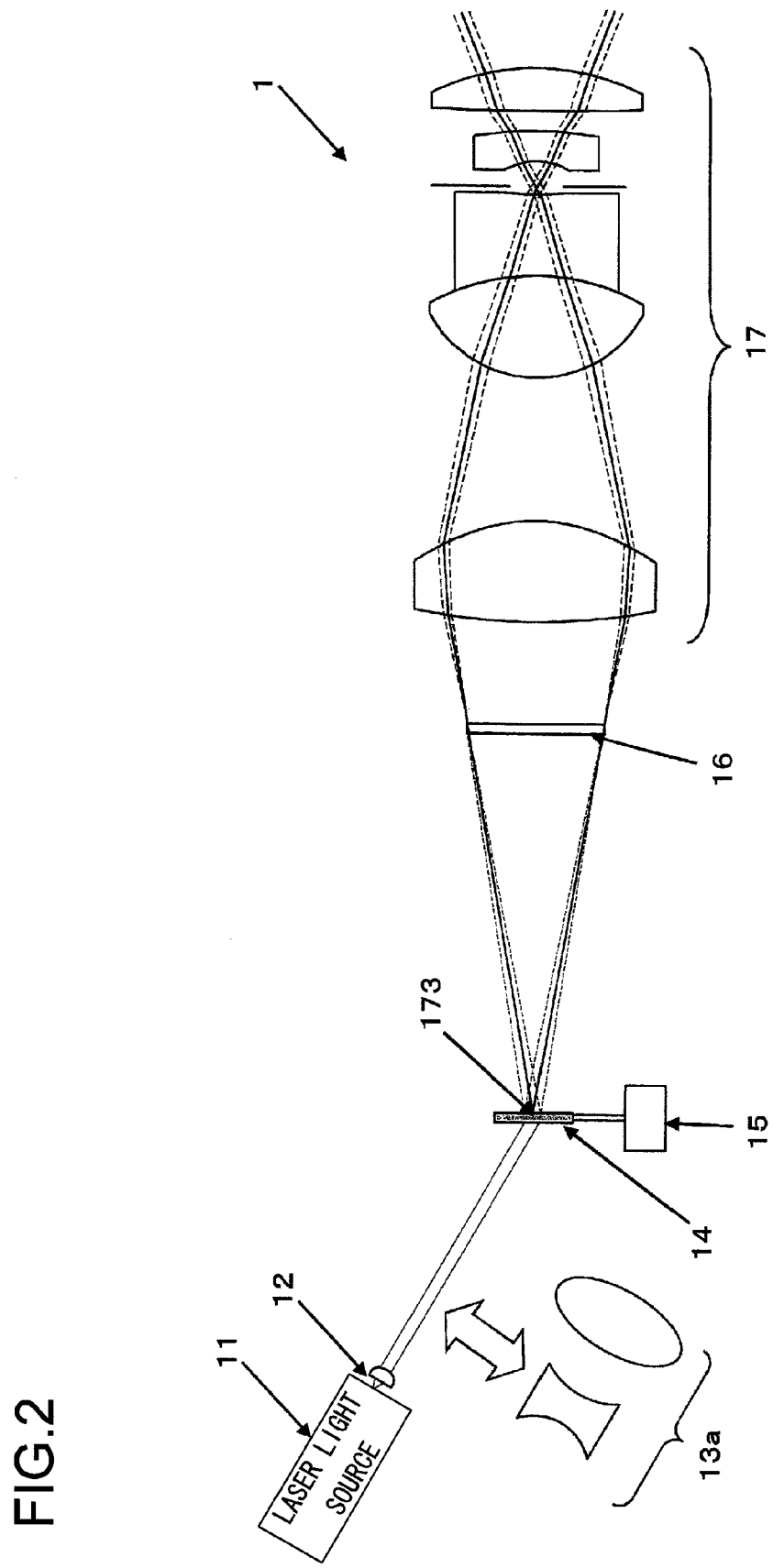
FIG. 2 is a schematic diagram showing the structure of this projector according to the first embodiment of the present invention in a similar manner, in another state thereof.

FIG. 2 shows the state of this projector 1 when the magnifying optical system 13a has been removed from the optical path of the collimated light. Due to the magnifying optical system 13a being removed from the optical path of the collimated light, the diameter of the ray bundle of the laser light for reproduction becomes smaller, and the projection numerical aperture of the reproduced holographic optical image becomes smaller. As a result, the focus depth of the optical image for projection becomes deeper, so that the freedom in focusing is enhanced.

On the other hand, due to the reduction of the projection numerical aperture of the reproduced holographic optical image, the range of angle of incidence of the reproduced holographic image upon the light modulation element 16 and the range of angle of incidence of the optical image for projection upon the screen both become narrower, so that the effect for reduction of the speckle noise becomes smaller. Moreover, although the diameter of the ray bundle that is incident upon the holographic recording medium 14 becomes smaller; the amount of light in the reproduced holographic optical image that falls upon the light modulation element 16 does not change.

In this manner, due to the fact that the entrance pupil position of the projection optical system 17 is approximately upon the holographic recording medium, it becomes possible, by inserting and removing the magnifying optical system 13a, to change over between a low speckle mode projection method in which the speckle noise is reduced, and a free focus mode projection method in which the focus depth is deep.

The first embodiment explained above may be implemented in various modified manners, as described below.

Figure 3:
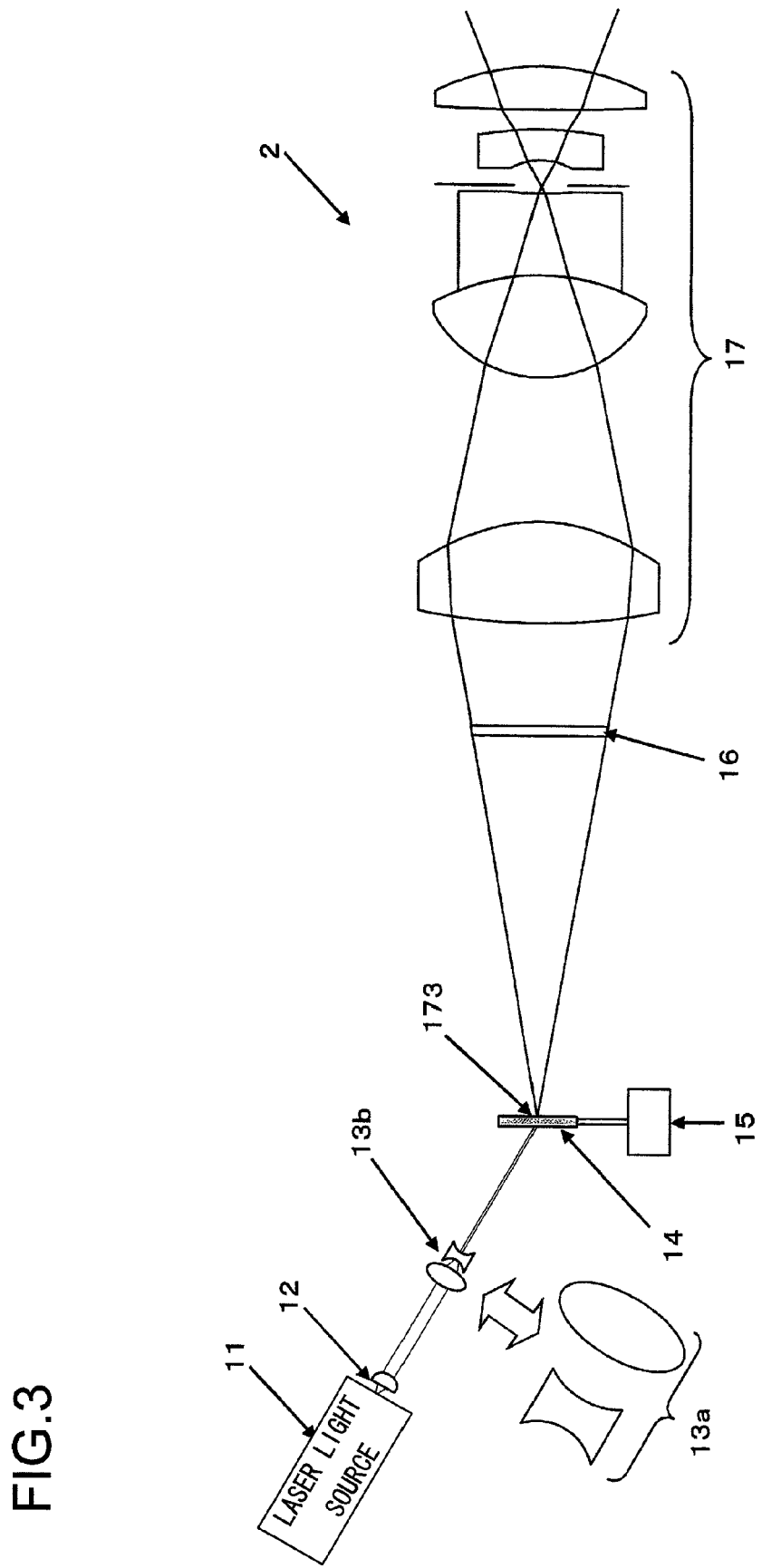
FIG. 3 shows, in a similar manner, an example of the structure of a variant embodiment of this projector according to the first embodiment of the present invention.

(1) With the projector 1 described above, it was arranged to change over between the low speckle mode projection method and the free focus mode projection method by inserting and removing the magnifying optical system 13a. However, in order to change over the projector 1 to the free focus mode, it would also be acceptable to arrange, not only to remove the magnifying optical system 13a from the optical path of the collimated light, but also, in the place of the magnifying optical system 13a, to insert an optical system that reduces the diameter of the ray bundle of the collimated light. FIG. 3 is a schematic diagram of a projector 2 in which, instead of the magnifying optical system 13a, a reduction optical system 13b that reduces the diameter of the ray bundle of the collimated light has been inserted. By inserting this reduction optical system 13b into the optical path of the collimated light, the projection numerical aperture of the reproduced holographic optical image becomes yet smaller and the focus depth of the optical image for projection becomes yet deeper, so that the freedom for focusing is further enhanced.

Figure 4:
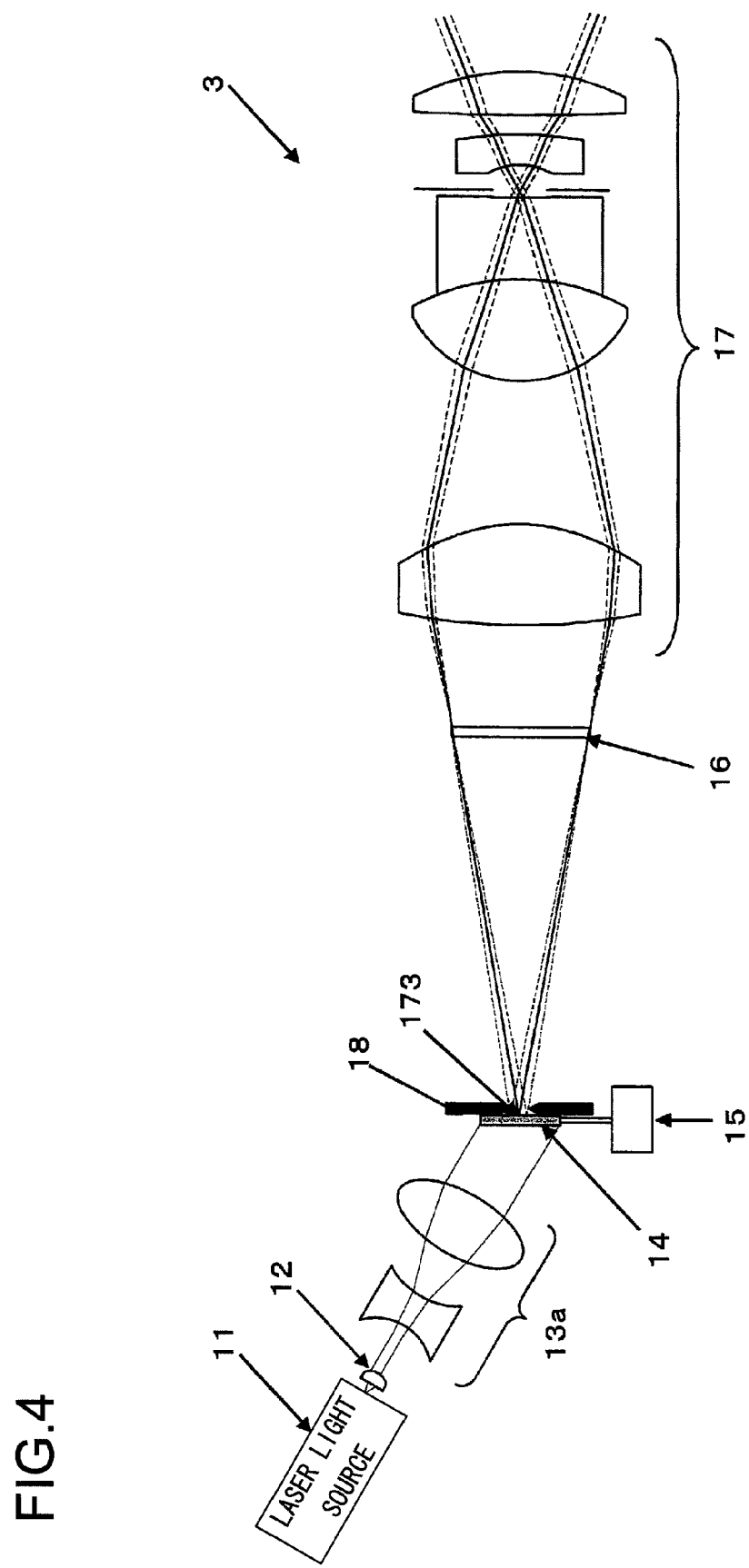
FIG. 4 shows, in a similar manner, another example of the structure of variant embodiment of this projector according to the first embodiment of the present invention.

(2) Furthermore it would also be acceptable, instead of inserting and removing the magnifying optical system 13a, to provide an iris member whose iris opening is variable at the surface of the holographic recording medium 14 facing towards the laser light source 11, or at its surface facing towards the light modulation element 16. FIG. 4 is a schematic figure showing a projector 3 to which an iris member 18 has been added at the surface of the holographic recording medium 14 that faces towards the light modulation element 16. Thus, in the FIG. 4 example, the laser light for reproduction is emitted towards the holographic recording medium 14 via the magnifying optical system 13a. Upon receiving this laser light for reproduction, the holographic recording medium 14 emits the reproduced holographic optical image from its region upon which that light has fallen, but the diameter of the ray bundle of the reproduced holographic optical image that irradiates the light modulation element 16 is limited by the diameter of the opening portion of the iris member 18. When the opening portion of the iris member 18 is at its maximum value, then the reproduced holographic optical image is emitted without any vignetting, and the projector 3 operates in the low speckle mode. But, along with the opening portion of the iris member 18 being squeezed down and its diameter becoming smaller, vignetting of the reproduced holographic optical image due to the iris member 18 becomes greater, and the diameter of the ray bundle of the reproduced holographic optical image emitted towards the light modulation element 16 becomes smaller (even in this case, the optical image for projection is projected by the projection optical system 17 without any vignetting). As a result, the projection numerical aperture of the reproduced holographic optical image becomes smaller, the focus depth of the optical image for projection becomes deeper, and the projector 3 transits to its free focus mode. Since it is arranged, when performing insertion and removal of the magnifying optical system 13a and so on, for it to be possible to reinsert the magnifying optical system 13a back upon the optical path of the collimated light after it has been removed from the optical path, accordingly it becomes necessary to provide some space for housing the magnifying optical system 13a in its inactive state. When changing over between the low speckle mode and the free focus mode is made possible with the iris member 18, then such physical space for housing the magnifying optical system 13a in its inactive state becomes unnecessary. However, the amount of light in the reproduced holographic optical image that is incident upon the light modulation element 16 becomes less.

If the iris member 18 is provided on the surface of the holographic recording medium 14 towards the laser light source 11, then the diameter of the ray bundle of the laser light for reproduction that is incident upon the holographic recording medium 14 is limited by this iris member 18. As a result, the diameter of the ray bundle of the reproduced holographic optical image that is emitted from the holographic recording medium 14 is also limited. When the diameter of the opening portion of the iris member 18 is at its maximum, then the diameter of the ray bundle of the laser light for reproduction that is incident upon the holographic recording medium 14 via the magnifying optical system 13a is not subjected to any limitation, and the projector 3 operates in its low speckle mode. Along with the diameter of the opening portion of the iris member 18 that is provided on the surface of the holographic recording medium 14 towards the laser light source becoming smaller, the diameter of the ray bundle of the reproduced holographic optical image that is emitted from the holographic recording medium 14 becomes smaller, and the projection numerical aperture of the reproduced photographic optical image also becomes smaller. And, due to the projection numerical aperture of the reproduced photographic optical image becoming smaller, the focus depth of the optical image for projection becomes deeper, and the projector 3 transits to its free focus mode.

—Embodiment #2—

Figure 5:
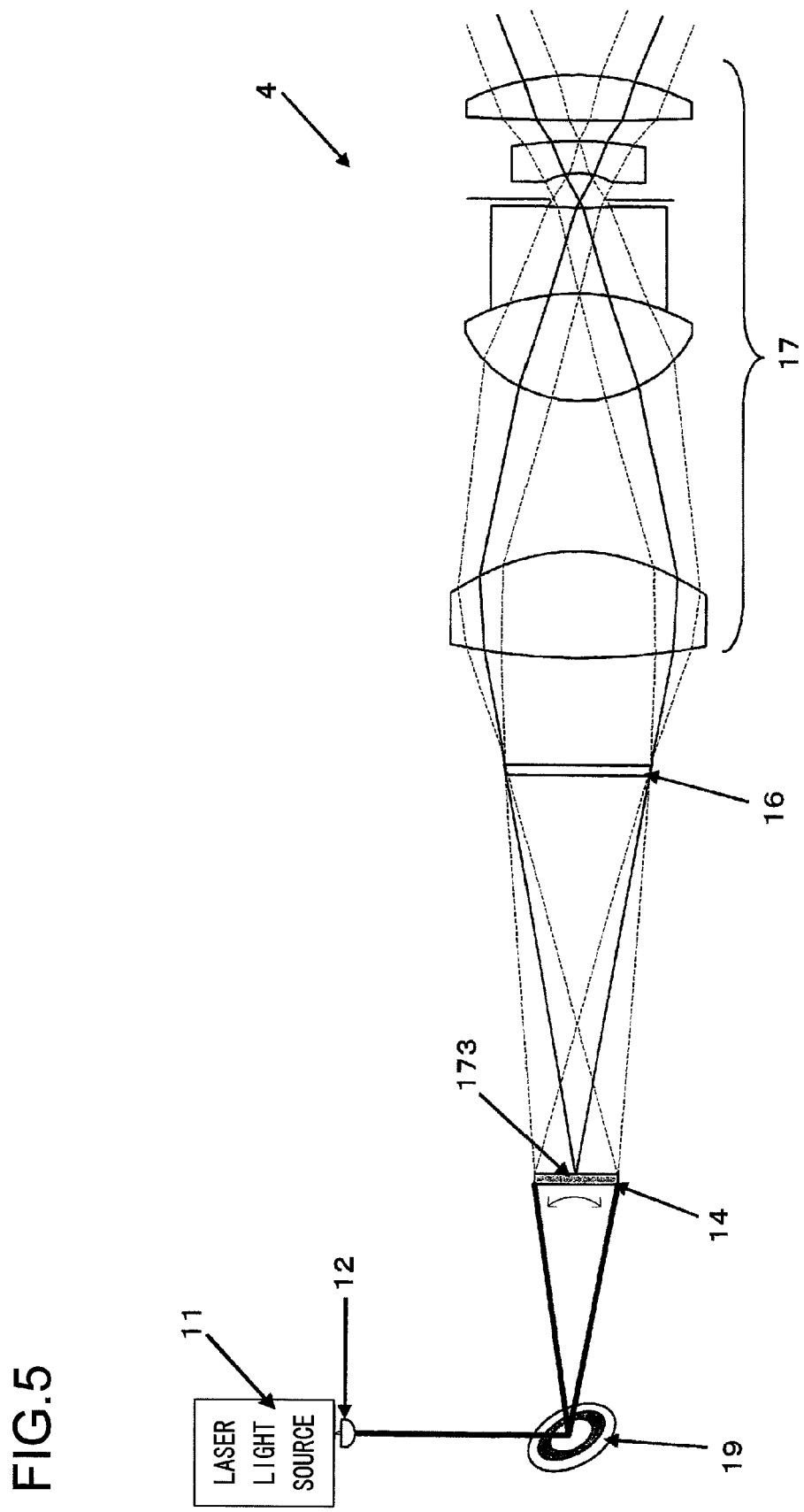
FIG. 5 is a schematic diagram showing an example of the structure of the structure of a projector according to a second embodiment of the present invention, in one state thereof.

FIG. 5 is a schematic diagram showing an example of the structure of a projector according to a second embodiment of the present invention. The projector 4 shown in FIG. 5 includes a laser light source 11, a condensing optical system 12, a holographic recording medium 14, a light modulation element 16, a projection optical system 17, and a scanning optical system 19. Since the laser light source 11, the condensing optical system 12, the holographic recording medium 14, the light modulation element 16, and the projection optical system 17 are the same as in the case of the first embodiment described above, explanation thereof will be omitted. It should be understood that while, as in FIG. 1, only one laser light source 11 is shown in the figure, it would be acceptable to arrange for a plurality thereof to be provided. Moreover, with regard to the position of the entrance pupil of the projection optical system 17 as well, in a similar manner to the case with FIG. 1, this is positioned more towards the laser light source side than the light modulation element 16, and is at a position denoted by 173 on the holographic recording medium 14 at the exit surface of the reproduced holographic optical image.

The scanning optical system 19 may be implemented with, for example, a MEMS mirror or a Galvano mirror or the like. Laser light that has been collimated by the condensing optical system 12 is incident upon the scanning optical system 19. The scanning optical system 19 reflects this incident laser light, and directs it upon the holographic recording medium 14 as laser light for reproduction. And the scanning optical system 19 changes the angle at which it reflects the laser light on a predetermined cycle, and accordingly changes the angle of incidence of the laser light for reproduction and the position at which it is incident upon the holographic recording medium 14. The holographic recording medium 14 is scanned by the laser light for reproduction as it changes over time, and a reproduced holographic optical image is emitted towards the light modulation element 16 by the region that has received the laser light for reproduction. In the following description, the angle of oscillation of the scanning optical system 19 as it scans the holographic recording medium 14 will be termed the scanning angle.

Each of the regions on the holographic recording medium 14 emits a reproduced holographic optical image towards the light modulation element 16. Due to this, the angle at which a reproduced holographic optical image is incident upon the light modulation element 16 varies according to the position of the region that has emitted that reproduced holographic optical image. Accordingly, the position of the region on the holographic recording medium 14 that receives the laser light for reproduction changes over time on the basis of the scanning cycle of the scanning optical system 19, and the angle at which the reproduced holographic optical image is incident upon the light modulation element 16 also changes over time. Due to this, changes over time also take place in the angle of emission of the optical image for projection emitted from the light modulation element 16, in the angle of incidence at which the optical image for projection is incident upon the screen, and so on. The speckle noise is reduced due to these changes over time of the angle of emission of the reproduced holographic optical image upon the light modulation element 16 and of the angle of incidence of the optical image for projection upon the screen and so on.

Furthermore, when the scanning angle of the scanning optical system 19 is as large as the entire region on the holographic recording medium 14 on which the holographic image is recorded that can be scanned, then the projection numerical aperture of the reproduced holographic optical image becomes larger. Due to this, the angles of incidence of the optical images for projection that are incident upon the screen are multiplexed over one another, so that the speckle noise is reduced.

Figure 6:
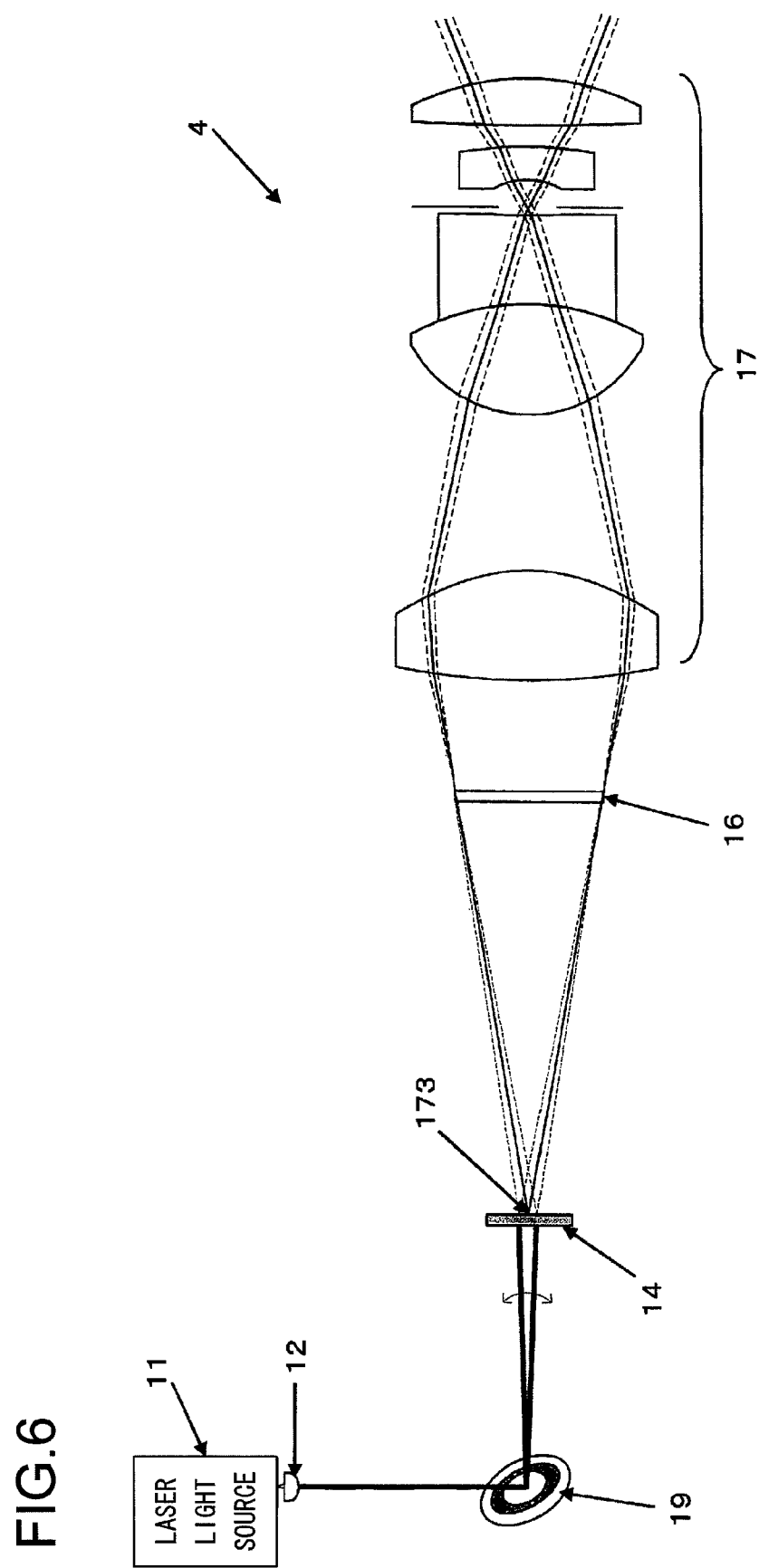
FIG. 6 shows the structure of this projector according to the second embodiment of the present invention in a similar manner, in another state thereof.

When as shown in FIG. 6 the scanning angle of the scanning optical system 19 is set to be small, then the projection numerical aperture of the reproduced holographic optical image becomes small. As a result, the focus depth becomes deep, and the freedom in focusing is enhanced. In this manner, with this second embodiment, it is possible to change over between the low speckle mode in which the speckle noise is reduced and the free focus mode in which the focus depth is deep, according to the scanning angle of the scanning optical system 19.

According to the first and the second embodiments explained above, the following beneficial operational effects are obtained. The projector 1 and the projector 2 include: the laser light source 11 that emits laser light; the condensing optical system 12 that collimates this laser light; the holographic recording medium 14 that, when laser light for reproduction is incident thereupon, emits a reproduced holographic optical image on the basis of a holographic image; the light modulation element 16 that has an image display region, and that modulates the reproduced holographic image at the image display region and emits the result to a projection optical system 17 as an optical image for projection; and the projection optical system 17 that projects a ray bundle based upon the optical image for projection. The projector 1 and the projector 2 both are able to provide a low speckle noise mode and a free focus mode. Since, with the projector 1 and also with the projector 2, the entrance pupil position of the projection optical system 17 and the position of the exit surface of the reproduced holographic optical image approximately coincide with one another, accordingly, with either of the projection methods that either of these projectors can employ, it is possible to project an optical image for projection with the projection optical system, without any vignetting.

The first and the second embodiments may be implemented in various other ways, as follows. While, in the first embodiment and the second embodiment, it was arranged for the holographic recording medium 14 to record a transmission type hologram, it would also be acceptable to arrange for it to record a reflective type hologram. Moreover, while a transmission type spatial light modulator was used as the light modulation element 16, it would also be acceptable to utilize a reflective type light modulation element, such as an LCOS (Liquid Crystal on Silicon) or a DMD (Digital Mirror Device) or the like.

—Embodiment #3—

Figure 7:
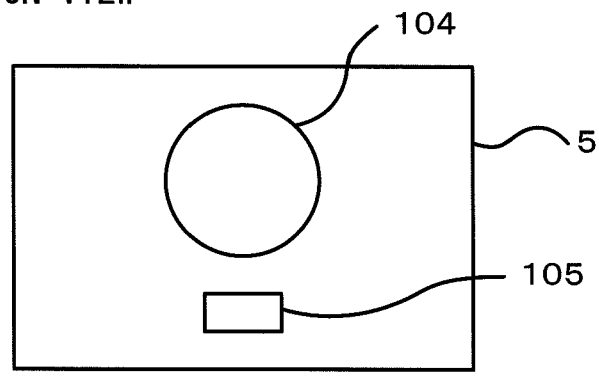
FIG. 7 is a plan view and an elevation view of a projector according to a third embodiment of the present invention.
Figure 7:
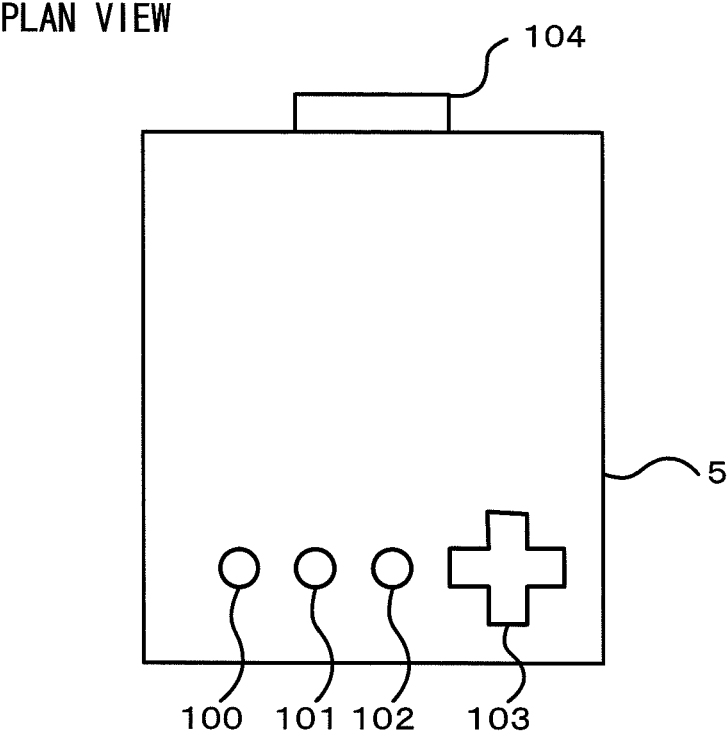

FIG. 7 is a schematic diagram showing a plan view and an elevation view of a projector 5 according to the third embodiment of the present invention. This projector 5 has a low speckle mode in which the focus depth is shallow and a free focus mode in which the focus depth is deep. A power supply switch 100, a projection mode changeover switch 101, a confirm switch 102, and a selection switch 103 are provided upon the upper surface of the projector 5. Moreover a projection aperture 104 and a range finding unit 105 are provided at the front of the projector 5.

The power supply switch 100 is an operating member for turning the power supply of the projector 5 on or off. And the projection mode changeover switch 101 is an operating member for changing over the projection mode of the projector 5. For example, when the projection mode changeover switch 101 is actuated after the power supply to the projector 5 has been turned on by the power supply switch 100 being actuated, then the projector 5 may change over to the low speckle mode. And, when the projection mode changeover switch 101 is actuated with the projector 5 in the low speckle mode, then the projector 5 may change over to the free focus mode. Moreover, when the projection mode changeover switch 101 is actuated with the projector 5 in the free focus mode, then the projector 5 may change over to the low speckle mode.

The confirm switch 102 and the selection switch 103 are operation members that the user employs for making settings of various types related to the projector 5. For example, items such as the projection mode and so on may be set on a setting screen that the projector 5 projects upon the screen. The optical image for projection from the projector 5 is projected towards a screen that is disposed in front of the projection aperture 104. The projection aperture 104 may include a mechanism for the user to adjust the focal point of the projector 5 manually. And the range finding unit 105 is a sensor for measuring the distance from the projector 5 to the screen.

Figure 8:
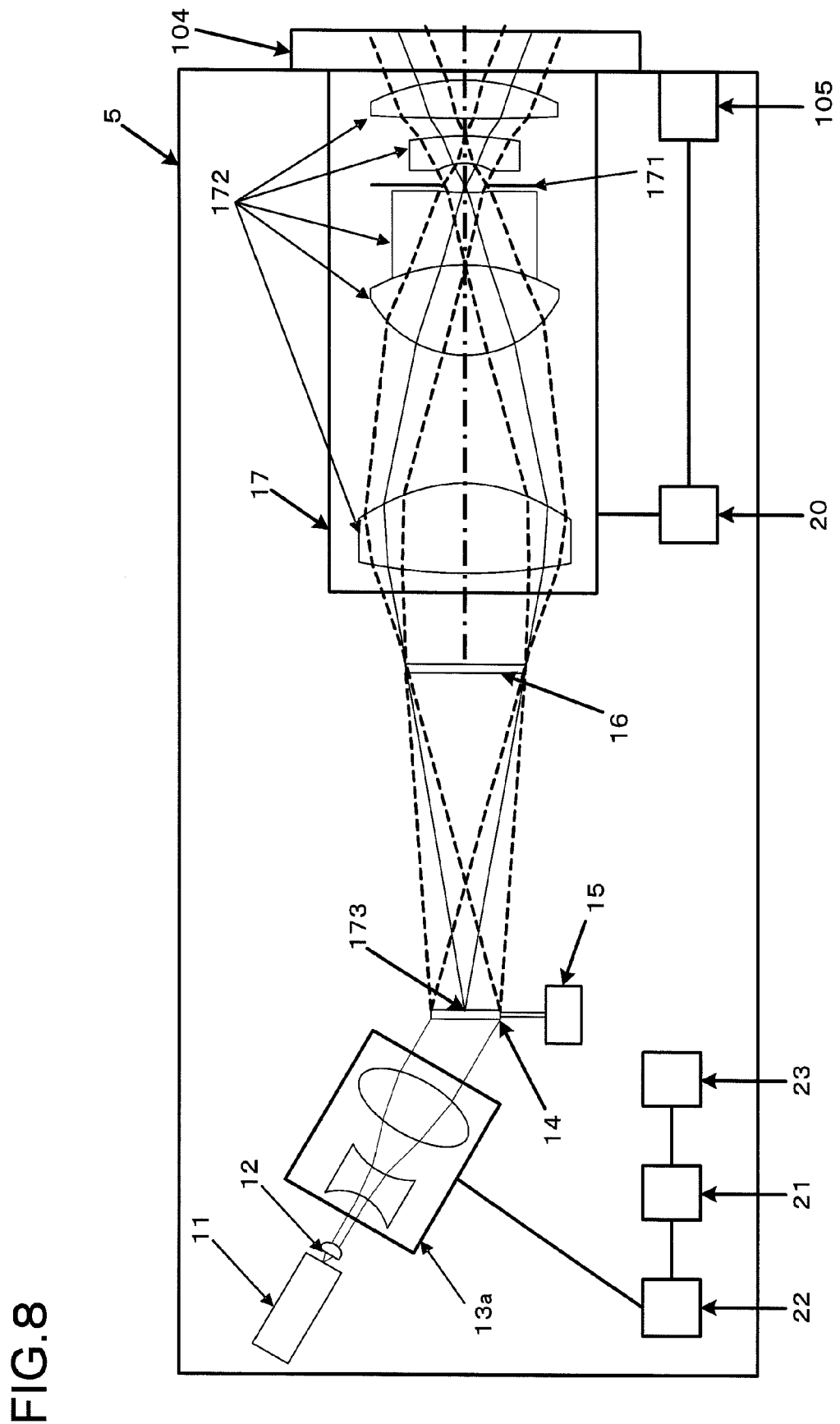
FIG. 8 is a schematic diagram showing an example of the internal structure of this projector according to the third embodiment of the present invention.

FIG. 8 is a schematic diagram showing the internal structure of this projector 5. In its interior, the projector 5 includes a laser light source 11, a condensing optical system 12, a magnifying optical system 13*a*, a holographic recording medium 14, a vibration element 15, a light modulation element 16, and a projection optical system 17. The projector 5 further includes in its interior a magnifying optical system drive unit 22, a projection optical system drive unit 20, a projection mode selection unit 21, and the range finding unit 105. It should be understood that, while only one laser light source is shown in FIG. 8, it would also be acceptable for a plurality thereof to be provided.

The condensing optical system 12 collimates the laser light emitted from the laser light source 11. The ray bundle collimated by the condensing optical system 12 (hereinafter termed the "collimated light") is emitted towards the holographic recording medium 14.

The magnifying optical system 13*a* increases the diameter of the ray bundle incident upon it. This magnifying optical system 13*a* is provided between the condensing optical system 12 and the holographic recording medium 14. The magnifying optical system 13*a* is driven by the magnifying optical system drive unit 22, and its shifting is controlled so that it is either in the state of being inserted into the optical path of the collimated light emitted from the condensing optical system 12, or is in the state of being removed from that collimated light optical path.

When the projector 5 is in the low speckle mode, the magnifying optical system 13*a* is inserted into the collimated light optical path, as shown in FIG. 8. At this time, the magnifying optical system 13*a* magnifies the diameter of the collimated light ray bundle. The ray bundle whose diameter has been magnified by the magnifying optical system 13*a* is then incident upon the holographic recording medium 14 as laser light for reproduction.

Figure 9:
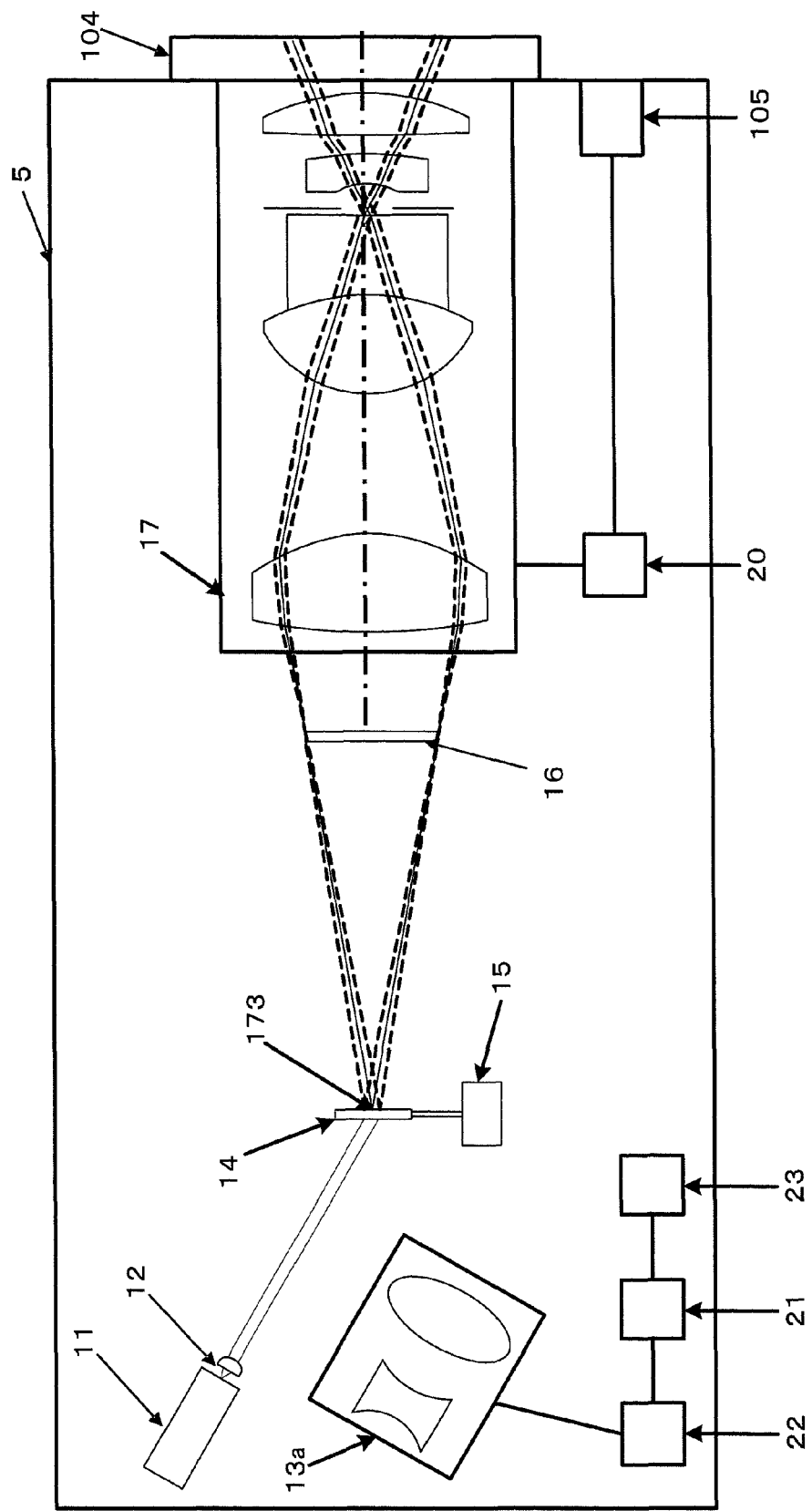
FIG. 9 is a figure for explanation of a method for changing over the focus depth of this projector according to the third embodiment of the present invention.

And, when the projector 5 is in the free focus mode, the magnifying optical system 13*a* is removed from the collimated light optical path, as shown in FIG. 9. At this time, the collimated light emitted from the condensing optical system 12 is incident upon the holographic recording medium 14 as laser light for reproduction.

The holographic recording medium 14 is a transmission type holographic type optical information recording and reproduction medium that employs the method of interference between two ray bundles. A diffuser type holographic image is recorded at each of the points upon this holographic recording medium 14. Each point on the holographic recording medium 14 that receives the laser light for reproduction emits a reproduction of the holographic image that was recorded towards the light modulation element 16. And the vibration element 15 vibrates the holographic recording medium 14, in order to reduce the speckle noise.

The reproduction of the holographic image emitted from each point on the holographic recording medium 14 is able to illuminate hole of an image modulation regeon of the light modulation element 16. The reproduction of the holographic image emitted from each point on the holographic recording medium 14 is multiplexed on the light modulation element 16. Even if the ray bundle diameter of the laser light incidents into the holographic recording medium 14 changes, the amount of light of the reproduction of the holographic image illuminating the light modulation element 16 does not change.

When the projector 5 is in the low speckle mode, the projection numerical aperture of the reproduced holographic optical image that is emitted from the holographic recording medium 14 becomes relatively large, since the diameter of the ray bundle of the light for reproduction that is incident upon the holographic recording medium 14 is magnified.

On the other hand, when the projector 5 is in the free focusing mode, the projection numerical aperture of the reproduced holographic optical image that is emitted from the holographic recording medium 14 becomes relatively small as compared to the low speckle mode, since the diameter of the ray bundle of the laser light for reproduction that is incident upon the holographic recording medium 14 is not magnified.

The light modulation element 16 is a transmission type spatial light modulator. This light modulation element 16 has an image modulation region, and the reproduced holographic optical image emitted from the holographic recording medium 14 is modulated by this image modulation region, and is transmitted through it towards the projection optical system 17 as an optical image for projection.

The holographic optical image that is incident upon the light modulation element 16 is able to irradiate the entire image modulation region of the light modulation element 16. When the projector 5 is in the low speckle mode, the numerical aperture of the reproduced holographic optical image that is incident upon the light modulation element 16 is relatively large. But, when the projector 5 is in the free focus mode, the numerical aperture of the reproduced holographic optical image that is incident upon the light modulation element 16 is relatively small.

The projection optical system 17 has an aperture iris 171 and a plurality of projection lenses 172. The entrance pupil of the projection optical system 17 is positioned more towards the light source side than the light modulation element 16, and lies approximately upon the holographic recording medium 14. The radius of the entrance pupil of the projection optical system 17 is sufficiently large to be able to cover the entire area of the holographic recording medium 14 upon which the holographic image is recorded. By setting the position of the entrance pupil in this manner, an optical image for projection based upon the reproduced holographic image is projected towards the screen without being vignetting by the aperture iris 171.

When the projector 5 is in the low speckle mode, the projection optical system drive unit 20 drives the projection optical system 17 in the direction of the optical axis and thereby adjusts the focal point of the projection optical system 17, on the basis of the distance from the projector 5 to the screen as calculated by the range finding unit 105. It should be understood that, when the projector 5 is in the free focus mode, the projection optical system 17 is adjusted to a predetermined position that is set in advance.

The projection mode selection unit 21 selects the projection mode of the projector 5. This projection mode selection unit 21 may, for example, include various types of sensor such as an acceleration sensor and a gyro sensor and so on that detect vibration and rotation and so on of the body of the projector 5, and a calculation unit that includes a CPU, a RAM, a ROM and so on.

The projection mode selection unit 21 determines whether or not the body of the projector 5 is stationary, on the basis of the output signals from the various sensors. And, if it is decided that the body of the projector 5 is stationary, then the projection mode selection unit 21 selects the low speckle mode. On the other hand, if it is decided that the body of the projector 5 is not stationary, then the projection mode selection unit 21 selects the free focus mode.

After the projection mode selection unit 21 has selected a projection mode for the projector 5, then the magnifying optical system 13a is driven by the magnifying optical system drive unit 22, so that the projector 5 is changed over to this projection mode. It should be understood that, if the user actuates the projection mode changeover switch 101 and changes over the projection mode of the projector 5 manually, then the projection mode to which the user has thus changed over manually is given priority over the projection mode to which the projection mode selection unit 21 has changed over.

Figure 10:
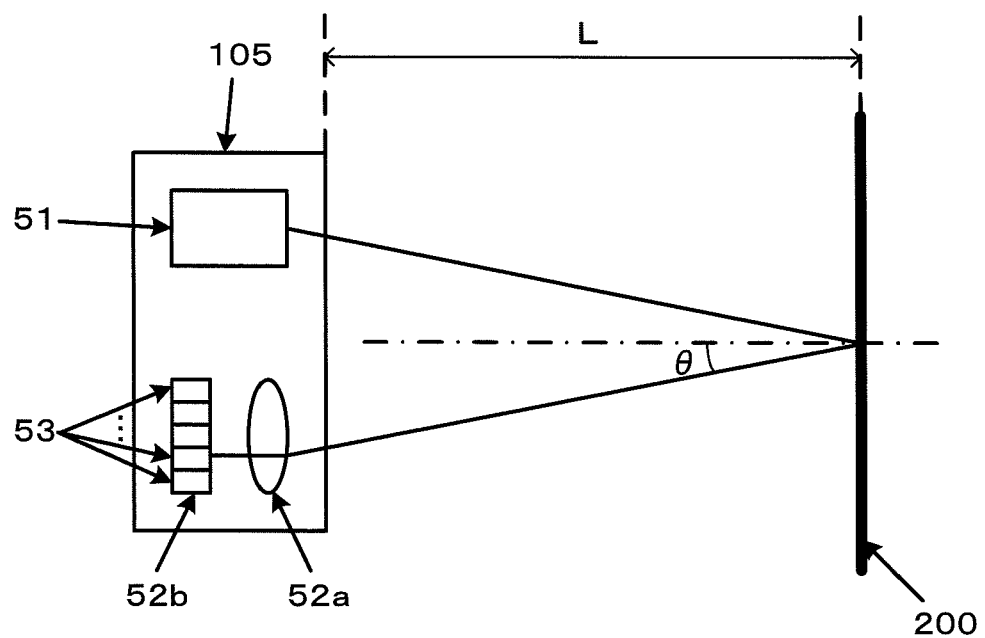
FIG. 10 is a figure for explanation of a range finding unit.

FIG. 10 is a figure showing an example of the structure of the range finding unit 105. The range finding unit 105 shown in FIG. 10 includes an infrared emission unit 51 and an infrared detection unit 52. The infrared detection unit 52 includes a detection optical system 52a and an infrared detection array 52b. The infrared detection array 52b includes a plurality of infrared receiving elements 53.

The infrared emission unit 51 emits infrared radiation at a predetermined emission angle towards the screen 200, that is in front of the projector 5. And the infrared detection unit 52 detects the infrared reflected by the screen 200. The infrared that is incident upon the infrared detection unit 52 is conducted by the detection optical system 52a to one or the other of the infrared receiving elements 53 of the infrared detection array 52b, and the distance to the screen 200 can be measured according to which of the infrared receiving elements 53 is the one to which it reaches.

Which of the infrared receiving elements 53 is reached by the infrared from the detection optical system 52a is determined by the angle at which the infrared is incident upon the detection optical system 52a. And the angle of incidence upon the detection optical system 52a is determined by the angle θ at which the infrared is reflected by the screen 200. This angle θ at which the infrared is reflected by the screen 200 becomes smaller; the greater is the distance between the front surface of the projector 5 and the screen 200.

Figure 11:
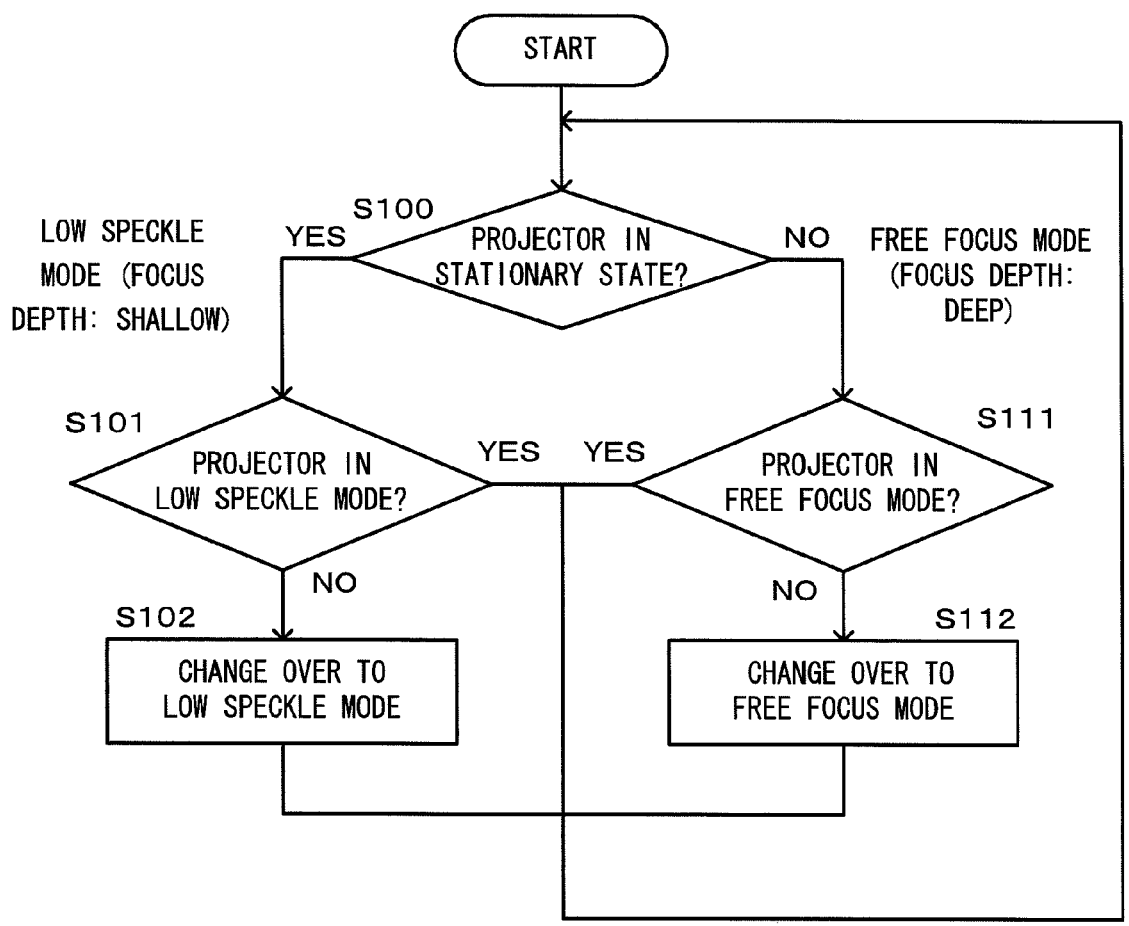
FIG. 11 is an example of a flow chart showing a processing flow for automatically changing over the focus depth of this projector according to the first embodiment of the present invention.

FIG. 11 shows an example of a flow chart related to the changeover processing for the projection mode of the projector 5. The processing in FIG. 11 is started when the supply of power to the projector 5 is turned on. In a first step S100, on the basis of the outputs of the various sensors, the projection mode selection unit 21 makes a decision as to whether or not the casing of the projector 5 is stationary. If the body of the projector 5 is stationary then the flow of control of changeover processing proceeds to a step SS01, whereas if the body of the projector 5 is not stationary then the flow of control is transferred to a step S111.

In the step S101, the projection mode selection unit 21 makes a decision as to whether or not the projector 5 is in the low speckle mode. If the projector 5 is in the low speckle mode, then the flow of control of changeover processing is returned to the step S100. But on the other hand, if the projector 5 is not in the low speckle mode, then the flow of control proceeds to a step S102.

In the step S102, the magnifying optical system drive unit 22 inserts the magnifying optical system 13a into the optical path of the collimated light, so that the projector 5 is changed over to the low speckle mode. After the projector 5 has thus been changed over to the low speckle mode, the flow of control of changeover processing returns to the step S100.

In the step S111, the projection mode selection unit 21 makes a decision as to whether or not the projector 5 is in the free focus mode. If the projector 5 is in the free focus mode then the projection mode selection unit 21 returns the flow of control to the step S100. But on the other hand, if the projector 5 is not in the free focus mode, then the flow of control proceeds to a step S112.

In the step S112, the magnifying optical system drive unit 14 removes the magnifying optical system 13a from the optical path of the collimated light, so that the projector 5 is changed over to the free focus mode. After the projector 5 has thus been changed over to the free focus mode, the flow of control of changeover processing returns to the step S100.

As explained above, the projection optical system drive unit 20 drives the projection optical system 17 and adjusts the focal point of the projection optical system 17 at every occasion of the projection mode of the projector 5 changing. Namely, in the step 102, the projection optical system drive unit 20 adjusts the focal point of the projection optical system 17 based upon the distance from the projector 5 to the screen measured by the range finding unit 105 at every occasion of the projection mode of the projector 5 changing to the low speckle mode. On the other hand, in the step 112 the projection optical system drive unit 20 arranges the projection optical system 17 to the predetermined place at every occasion of the projection mode of the projector 5 changing to the free focus mode.

The third embodiment of the present invention explained above provides the following beneficial operational effects. The projector 5 includes the light modulation element 16 that modulates the reproduced holographic optical image corresponding to the laser light emitted from the laser light source 11 and emits an optical image for projection. And the optical image for projection that is incident from the light modulation element 16 upon the projection optical system 17 is projected towards the screen. Moreover, the projection mode selection unit 21 selects whether to set the projector 5 to the low speckle mode in which the focus depth is shallow or to the free focus mode in which the focus depth is deep, on the basis of whether or not the body of the projector 5 is stationary. When setting the projector 5 to the low speckle mode, the projection mode selection unit 21 inserts the magnifying optical system 13a into the optical path of the collimated light, and thus magnifies the diameter of the ray bundle of the reproduced holographic image that is emitted from the holographic recording medium 14. Due to this, the numerical aperture of the reproduced holographic optical image that is incident upon the light modulation element 16 becomes larger, and the focus depth of the optical image for projection becomes shallower. On the other hand, when setting the projector 5 to the free focus mode, the projection mode selection unit 21 removes the magnifying optical system 13*a* from the optical path of the collimated light, and thus reduces the diameter of the ray bundle of the reproduced holographic image that is emitted from the holographic recording medium 14. Due to this, the numerical aperture of the reproduced holographic optical image that is incident upon the light modulation element 16 becomes smaller than in the low speckle mode, so that the focus depth of the optical image for projection becomes deeper. And, due to the above operation, the projector 5 is able to utilize the plurality of projection methods by changing over between them, so that it is able to cope with various different types of usage environment.

—Embodiment #4—

Figure 12:
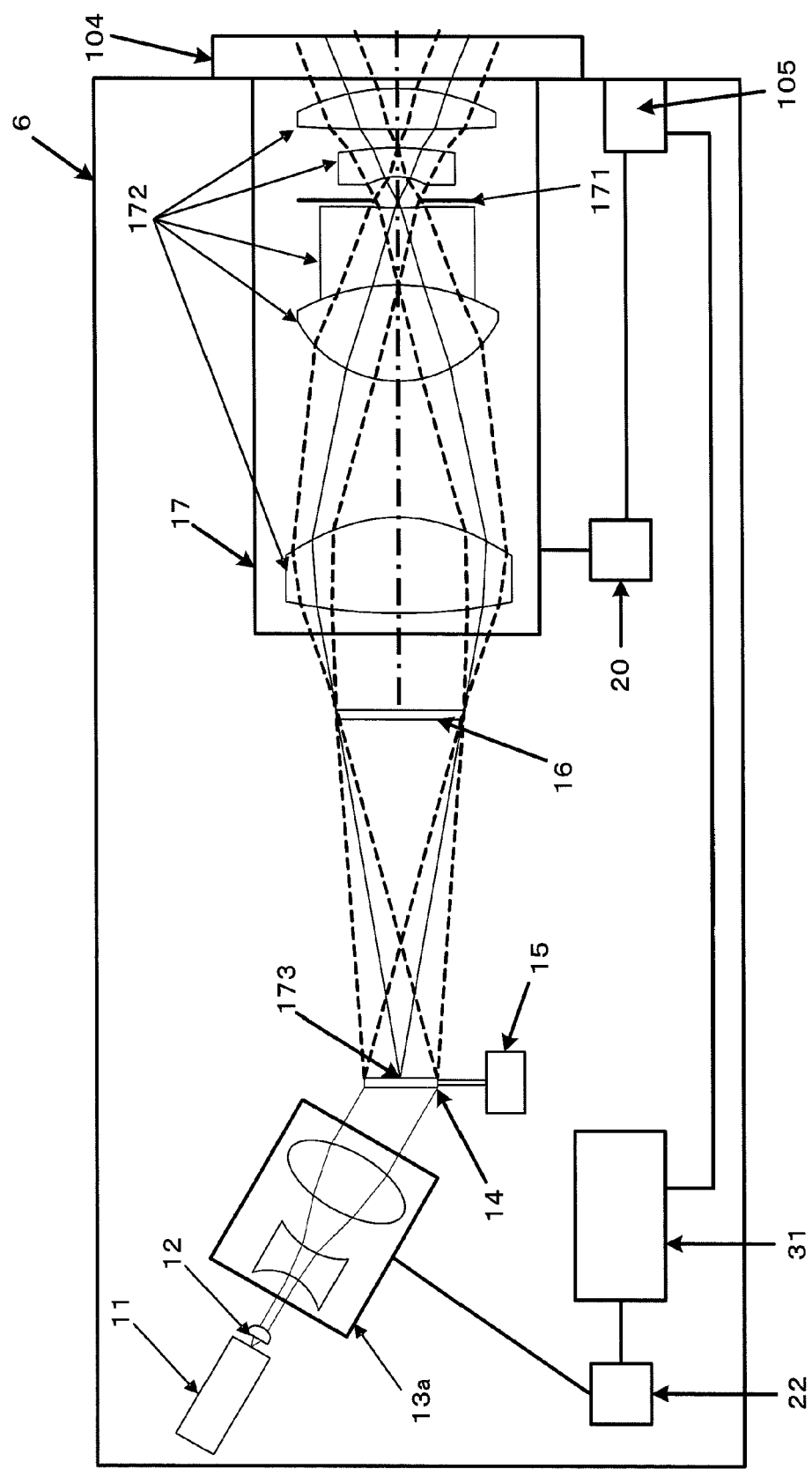
FIG. 12 is a schematic diagram showing an example of the internal structure of a projector according to a fourth embodiment of the present invention.

A fourth embodiment of the present invention will now be explained. In the projector according to this fourth embodiment of the present invention, the processing for changing over between the projection modes is different from the changeover processing in the projector 5 according to the third embodiment. FIG. 12 is a schematic diagram showing an example of the internal structure of this projector 6 according to the fourth embodiment of the present invention. The same reference symbols are appended in FIG. 12 to elements that have structures and functions similar to ones of the projector 5 according to the third embodiment, and description thereof is omitted. In this projector 6, instead of the projection mode selection unit 21 of the third embodiment, a projection mode selection unit 31 is provided. This projection mode selection unit 31 includes a CPU, a RAM, a ROM and so on, and is connected to the range finding unit 105 and to the magnifying optical system drive unit 22.

The projection mode selection unit 31 of the projector 6 temporarily changes over the projector 6 to the free focus mode when the distance from the front surface of the projector 6 to the screen has changed to be greater than the focal depth in the low speckle mode. And the projection mode selection unit 31 changes over the projector 6 to the low speckle mode when the change of the distance from the front surface of the projector 6 to the screen has become less than the focal depth in the free focus mode.

The projection mode selection unit 31 acquires information related to the distance from the front surface of the projector 6 to the screen from the range finding unit 105, and selects a projection mode for the projector 6 on the basis of this information which it has acquired from the range finding unit 105. And the range finding unit 105 measures the distance from the front surface of the projector 6 to the screen, and transmits information related to this measured distance (termed the "distance information") in real time to the projection mode selection unit 31. It should be understood that if the user actuates the projection mode changeover switch 101 and changes over the projection mode of the projector 6 manually, then the projection mode to which the user has thus changed over manually is given priority over the projection mode to which the projection mode selection unit 31 has changed over.

Figure 13:
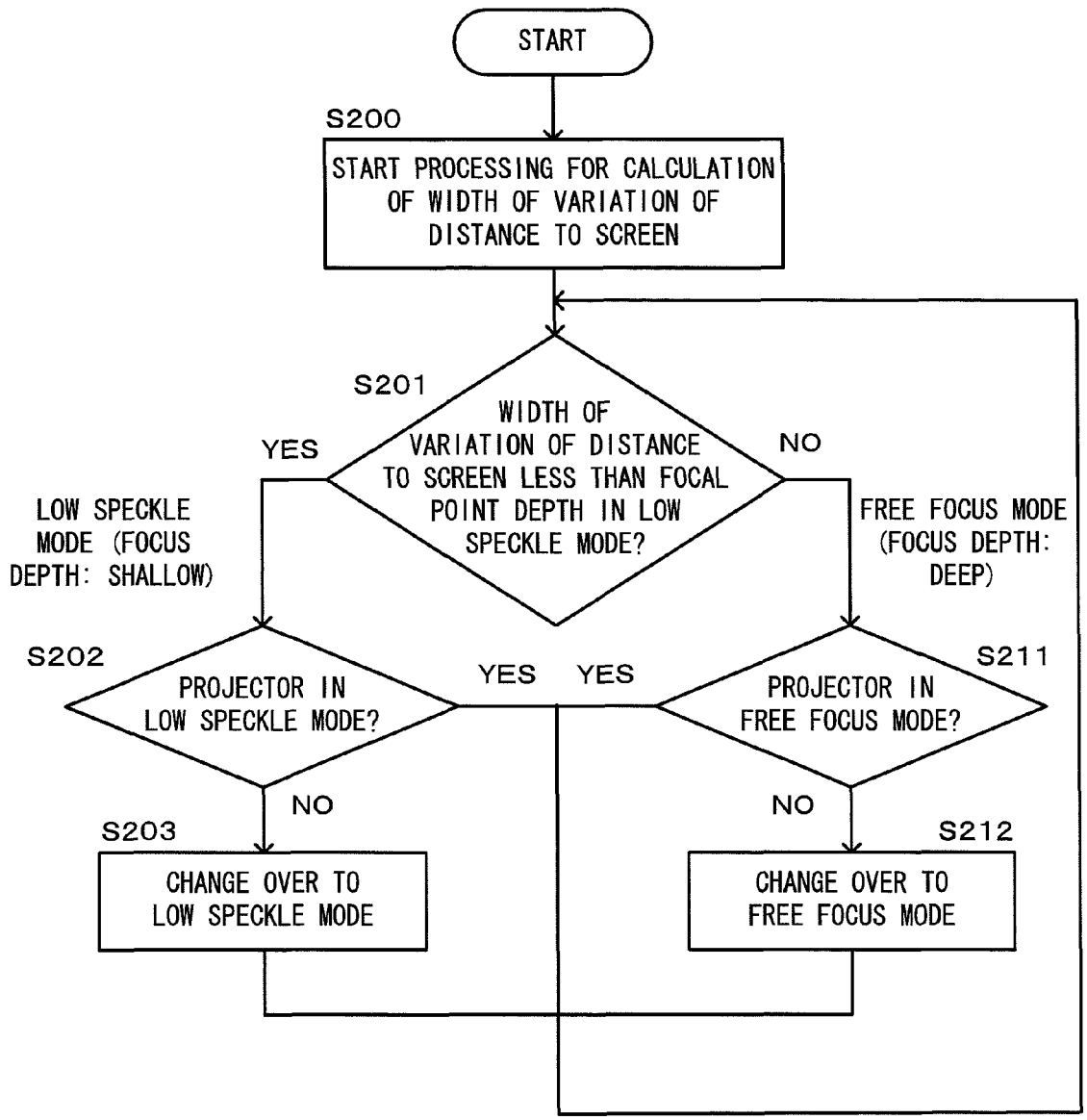
FIG. 13 is an example of a flow chart showing a processing flow for automatically changing over the focus depth of this projector according to the fourth embodiment of the present invention.

FIG. 13 shows an example of a flow chart related to the changeover processing for the projection mode of the projector 6 of this fourth embodiment of the present invention. The processing in FIG. 13 is started when the supply of power to the projector 6 is turned on. When the power supply to the projector 6 is turned on, the range finding unit 105 starts to measure the distance from the front surface of the projector 6 to the screen, and starts to transmit this distance information to the projection mode selection unit 31.

In the step S200, on the basis of the distance information which it has received, the projection mode selection unit 31 starts processing to calculate the width of variation of the distance from the front surface of the projector 6 to the screen during an interval of a predetermined duration. This interval of a predetermined duration may, for example, be the time interval from the present time instant to a time instant a predetermined time period before (for example, one minute before). Moreover, the width of variation of the distance from the front surface of the projector 6 to the screen is the difference between the maximum value and the minimum value of the distance measured by the range finding unit 105 during that interval of a predetermined duration.

In the step S201, the projection mode selection unit 31 makes a decision as to whether or not the width of variation of the distance from the front surface of the projector 6 to the screen is less than or equal to the focus depth in the low speckle mode. If the width of variation of the distance from the front surface of the projector 6 to the screen is less than or equal to the focus depth in the low speckle mode, then the flow of control of this changeover processing proceeds to a step S202, while, if the width of variation of the distance from the front surface of the projector 6 to the screen is greater than the first low speckle mode focus depth, then the flow of control is transferred to a step S211.

In the step S202, the projection mode selection unit 31 makes a decision as to whether or not the projector 6 is in the low speckle mode. If the projector 6 is in the low speckle mode, then the flow of control of changeover processing is returned to the step S201. But on the other hand, if the projector 6 is not in the low speckle mode, then the flow of control proceeds to a step S203.

In the step S203, the projection mode selection unit 31 inserts the magnifying optical system 13*a* into the optical path of the collimated light by using the magnifying optical system drive unit 22, so that the projector 6 is changed over to the low speckle mode. After the projector 6 has thus been changed over to the low speckle mode, the flow of control of changeover processing returns to the step S201.

In the step S211, the projection mode selection unit 31 makes a decision as to whether or not the projector 6 is in the free focus mode. If the projector 6 is in the free focus mode, then the projection mode selection unit 31 returns the flow of control to the step S201. But on the other hand, if the projector 6 is not in the free focus mode, then the flow of control proceeds to a step S212.

In the step S212, the projection mode selection unit 31 removes the magnifying optical system 13 from the optical path of the collimated light by using the magnifying optical system drive unit 14, so that the projector 6 is changed over to the free focus mode. After the projector 6 has thus been changed over to the free focus mode, the flow of control of changeover processing returns to the step S201.

It should be understood that, in a similar manner to the case with the third embodiment, each time the projection mode of the projector 6 is changed over, the projection optical system drive unit 20 drives the projection optical system 17 in the direction of the optical axis, and adjusts the focal point of the projection optical system. In other words, in the step 203, when the projector 6 is changed over to the low speckle mode, the projection optical system drive unit 20 adjusts the focal point of the projection optical system 17 on the basis of the distance from the projector 6 to the screen as calculated by the range finding unit 105. On the other hand, in the step S212, when the projector 6 is changed over to the free focus mode, the projection optical system drive unit 20 adjusts the projection optical system 17 to a predetermined position that is set in advance.

The fourth embodiment of the present invention explained above provides the following beneficial operational effects. This projector 6 includes the light modulation element 16 that modulates the reproduced holographic optical image corresponding to the laser light emitted from the laser light source 11, and that emits the resulting optical image for projection. And the optical image for projection that is incident from the light modulation element 16 upon the projection optical system 17 is projected towards the screen. The projection mode selection unit 31 selects either the low speckle mode in which the focus depth is shallow or the free focus mode in which the focus depth is deep, on the basis of the distance information received from the range finding unit 105. When the projector 6 is to be set to the low speckle mode, then the projection mode selection unit 31 inserts the magnifying optical system 13a into the optical path of the collimated light, and thus magnifies the diameter of the ray bundle of the reproduced holographic optical image emitted from the holographic recording medium 14. Due to this, the incident numerical aperture of the reproduced holographic optical image that is incident upon the light modulation element 16 becomes relatively large, and the focus depth of the optical image for projection becomes relatively shallow. On the other hand, when the projector 6 is to be set to the free focus mode, then the projection mode selection unit 31 removes the magnifying optical system 13a from the optical path of the collimated light. Due to this, the incident numerical aperture of the reproduced holographic optical image that is incident upon the light modulation element 16 becomes smaller than in the first projection mode, and the focus depth of the optical image for projection becomes relatively deep. Thus, according to the above procedure, it is possible for the projector 6 to change over between a plurality of focus modes whose focus depths are different, so that it is possible to cope with various different types of usage environment.

—Embodiment #5—

A fifth embodiment of the present invention will now be explained. In the projector according to this fifth embodiment of the present invention, the processing for changing over between the projection modes is different from the changeover processing in the projector 5 according to the third embodiment and the projector 6 according to the fourth embodiment.

Figure 14:
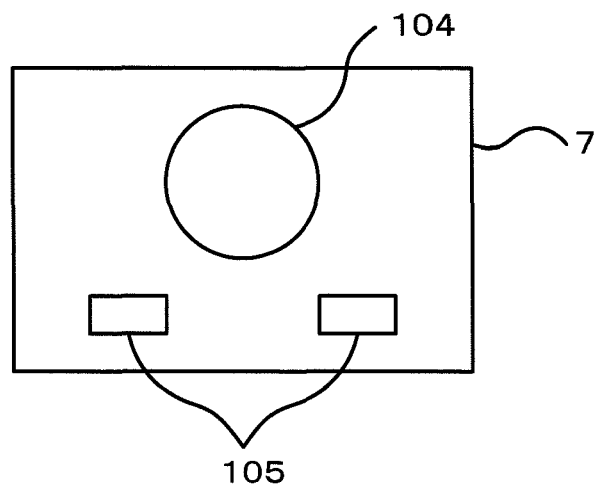
FIG. 14 is a plan view and an elevation view of a projector according to a fifth embodiment of the present invention.
Figure 14:
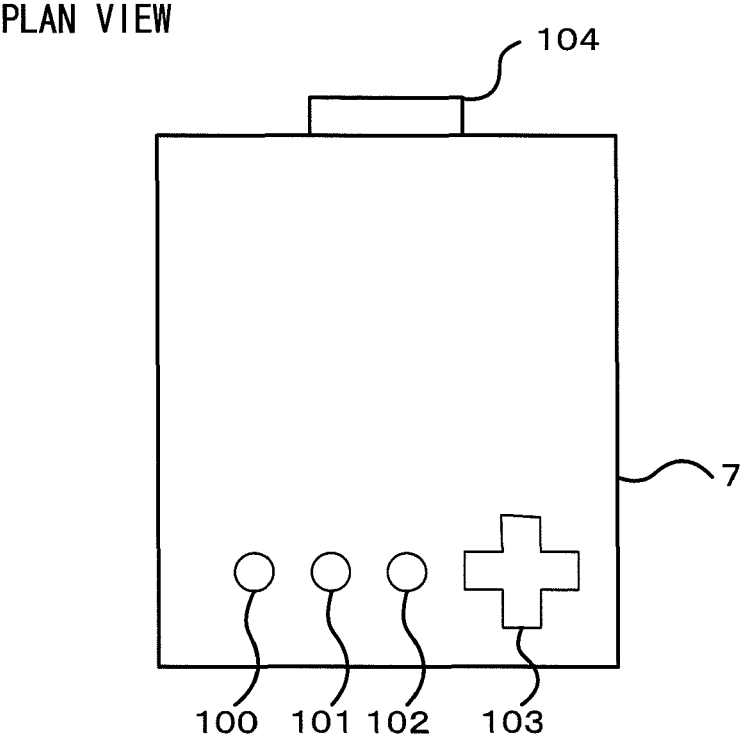

FIG. 14 is a figure showing examples of a plan view and an elevation view of this projector 7 according to the fifth embodiment of the present invention. As shown in FIG. 14, this projector 7 is provided with a plurality of range finding units 105. Each of the plurality of range finding units 105 measures the distance from the front surface of the projector 7 to the screen.

Figure 15:
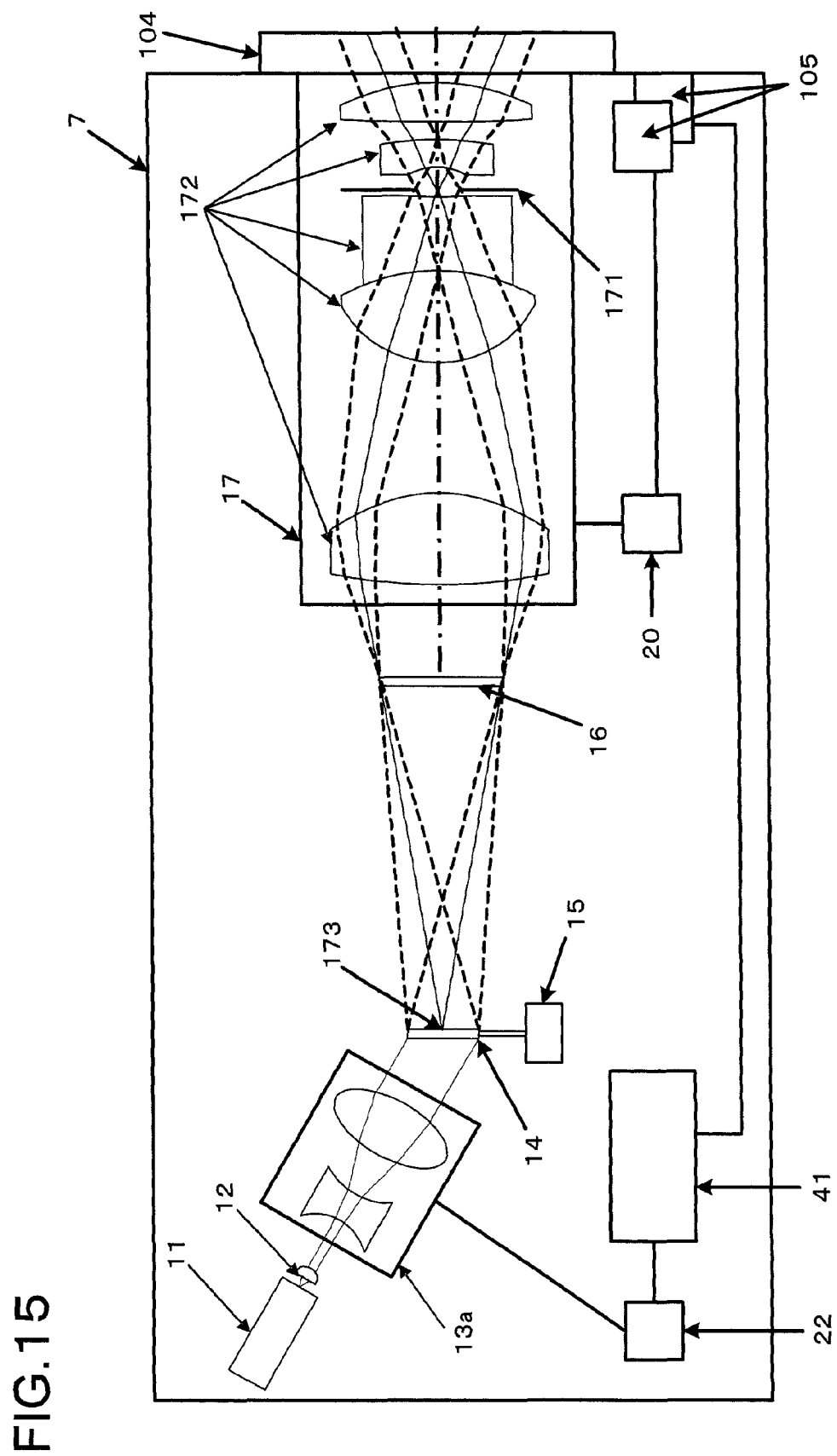
FIG. 15 is a schematic diagram showing an example of the internal structure of this projector according to the fifth embodiment of the present invention.

FIG. 15 is a schematic diagram showing an example of the internal structure of this projector 7 according to the fifth embodiment of the present invention. The same reference symbols are appended in FIG. 15 to elements that have structures and functions similar to ones of the projector 5 according to the third embodiment, and description thereof is omitted. In this projector 7, instead of the projection mode selection unit 21 of the third embodiment, a projection mode selection unit 41 is provided. This projection mode selection unit 41 includes a CPU, a RAM, a ROM and so on, and is connected to the plurality of range finding units 105 and to the magnifying optical system drive unit 22.

The projection mode selection unit 41 acquires information related to the distance from the front surface of the projector 7 to the screen from the plurality of range finding units 105, and selects a projection mode for the projector 7 on the basis of this information that it has acquired from the plurality of range finding units 105. Each of the plurality of range finding units 105 measures the distance from the front surface of the projector 7 to the screen, and transmits information related to this measured distance in real time to the projection mode selection unit 41.

The projection mode selection unit 41 of the projector 7 calculates the difference of the distances measured by each of the plurality of range finding units 105. And the projection mode selection unit 41 changes over the projector 7 to the low speckle mode when this difference is less than or equal to a predetermined value. Moreover, on the other hand, the projection mode selection unit 41 changes over the projector 7 to the free focus mode when this difference is greater than the predetermined value.

It should be understood that if the user actuates the projection mode changeover switch 101 and changes over the projection mode of the projector 3 manually, then the projection mode to which the user has thus changed over manually is given priority over the projection mode to which the projection mode selection unit 41 has changed over.

Figure 16:
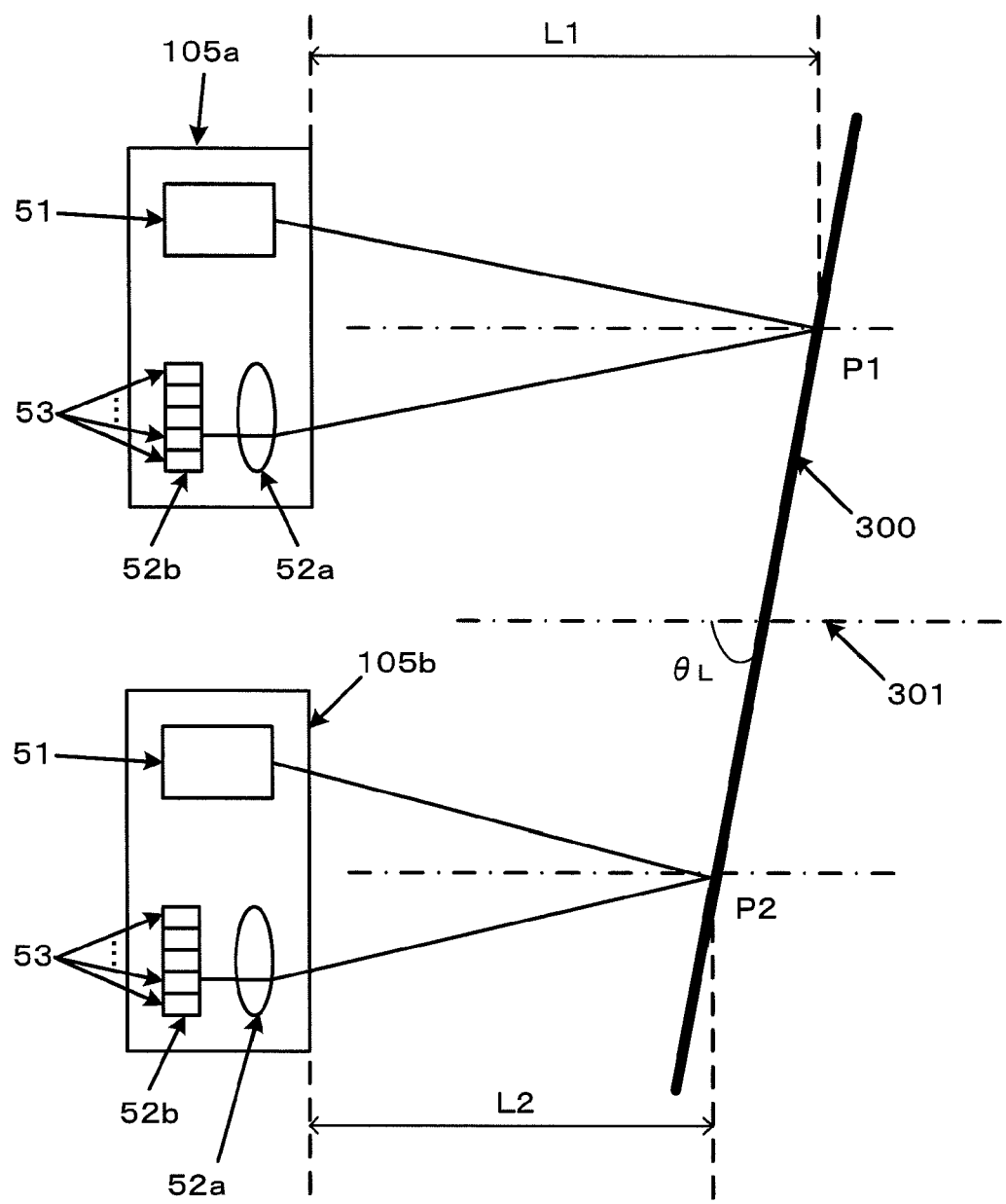
FIG. 16 is an example of a flow chart showing a processing flow for automatically changing over the focus depth of this projector according to the fifth embodiment of the present invention.

FIG. 16 is a figure for explanation of the changeover processing performed by the projection mode selection unit 41. In FIG. 16, a plurality of range finding units 105a and 105b and the screen 300 are shown. The range finding unit 105a measures the distance L1 to a point P1 upon the screen 300. And the range finding unit 105b measures the distance L2 to a point P2 upon the screen 300. In the example shown in FIG. 16, the projection mode selection unit 41 (not shown in FIG. 16) calculates the difference |L1−L2| between the distances measured by the range finding unit 105a and the range finding unit 105b. This difference of distances |L1−L2| becomes zero when the screen 300 is a plane that is perpendicular with respect to the direction 301 in which the optical image is projected. In FIG. 16, the screen 300 and the direction of projection 301 of the optical image are not orthogonal, so that a tilt angle θ is created. The projection mode selection unit 41 changes over the projector 3 to the low speckle mode when the value of the difference of distances |L1−L2| is less than a predetermined value (for example, the focal depth of the projector 3) (i.e. when the tilt angle $\theta_L$ is greater than a predetermined angle). Moreover, on the other hand, the projection mode selection unit 41 changes over the projector 3 to the free focus mode when this difference |L1−L2| is greater than the predetermined value (i.e. when the tilt angle $\theta_L$ is less than the predetermined angle). By changing over to the free focus mode, it is possible to suppress blurring of any portion of the optical image projected upon the screen 300, that may be accompanied by reduction of the image quality.

Figure 17:
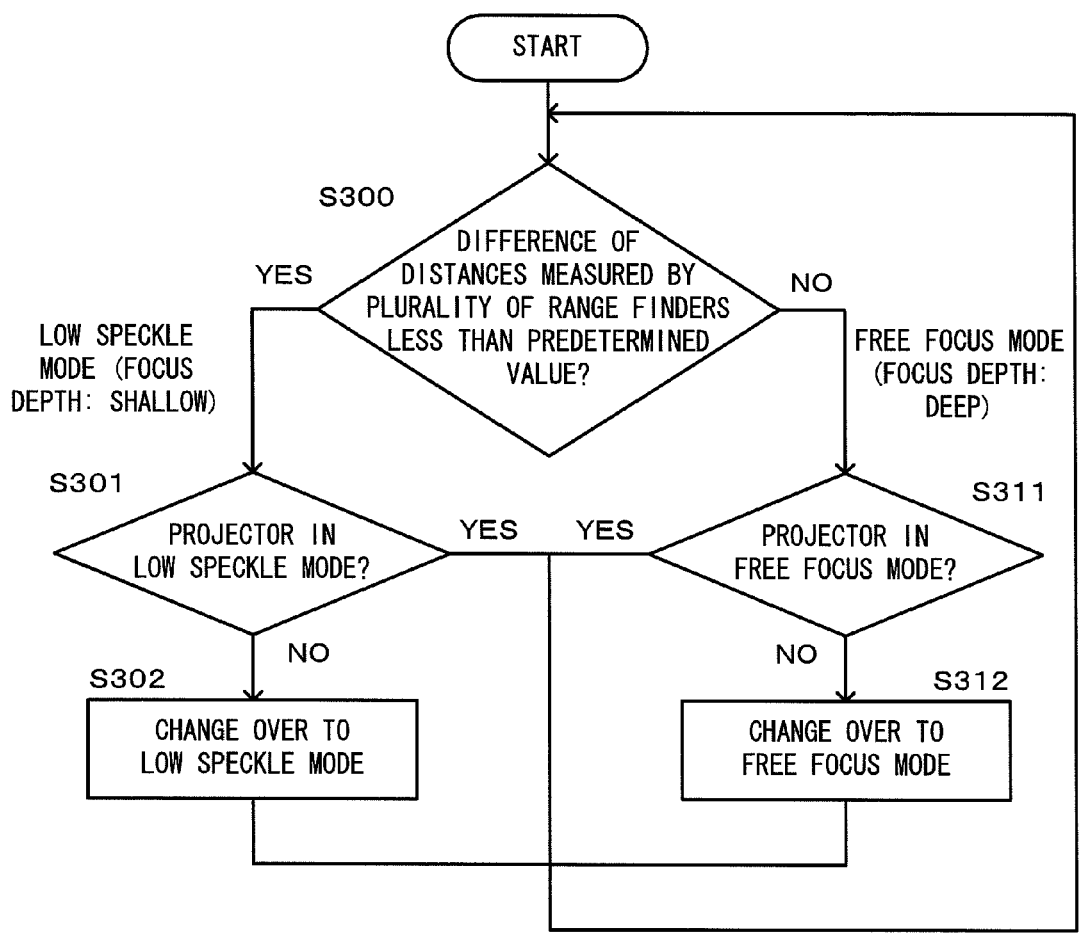
FIG. 17 is an example of a flow chart showing a processing flow for automatically changing over the focus depth of this projector according to the fifth embodiment of the present invention.

FIG. 17 shows an example of a flow chart related to the changeover processing for the projection mode of the projector 3 of this fifth embodiment of the present invention. The processing in FIG. 17 is started when the supply of power to the projector 7 is turned on. When the power supply to the projector 7 is turned on, each of the plurality of range finding units 105 starts to measure the distance from the front surface of the projector 7 to the screen, and starts to transmit this distance information to the projection mode selection unit 41.

In a first step S300, on the basis of the distance information that it has received from each of the plurality of range finding units 105, the projection mode selection unit 41 makes a decision as to whether or not the difference between the distances measured by the plurality of range finding units 105 from the front surface of the projector 7 to the screen is less than or equal to a predetermined value (For example, |L1−L2| in FIG. 16). If this difference between the plurality of distances that have been measured is less than or equal to the predetermined value, then it is decided that the screen is substantially perpendicular to the direction of projection of the optical image for projection and also that it is substantially planar and has low concavity and convexity, and the flow of control of this changeover processing proceeds to a step S301. On the other hand, if the difference between the plurality of distances that have been measured is larger than the predetermined value, then it is decided that the screen is not substantially perpendicular to the direction of projection of the optical image for projection or that it is substantially concave or convex, and then the flow of control is transferred to a step S311.

In the step S301, the projection mode selection unit 41 makes a decision as to whether or not the projector 7 is in the low speckle mode. If the projector 7 is in the low speckle mode, then the flow of control of changeover processing is returned to the step S300. But on the other hand, if the projector 7 is not in the low speckle mode, then the flow of control proceeds to a step S302.

In the step S302, the magnifying optical system drive unit 22 inserts the magnifying optical system 13a into the optical path of the collimated light, so that the projector 7 is changed over to the low speckle mode. After the projector 7 has thus been changed over to the low speckle mode, the flow of control of changeover processing returns to the step S300.

In the step S311, the projection mode selection unit 41 makes a decision as to whether or not the projector 7 is in the free focus mode. If the projector 7 is in the free focus mode, then the projection mode selection unit 31 returns the flow of control to the step S300. But on the other hand, if the projector 7 is not in the free focus mode, then the flow of control proceeds to a step S312.

In the step S312, the magnifying optical system drive unit 22 removes the magnifying optical system 13a from the optical path of the collimated light, so that the projector 7 is changed over to the free focus mode. After the projector 7 has thus been changed over to the free focus mode, the flow of control of changeover processing returns to the step S300.

It should be understood that, in a similar manner to the case with the fourth embodiment, each time the projection mode of the projector 7 is changed over, the projection optical system drive unit 20 drives the projection optical system 17 in the direction of the optical axis, and adjusts the focal point of the projection optical system 17. In other words, when in the step S302 the projector 7 has been changed over to the low speckle mode, the projection optical system drive unit 20 adjusts the focus of the projection optical system 17 on the basis of the distances from the projector 7 to the screen as calculated by the plurality of range finding units 105. On the other hand, when in the step S312 the projector 7 is changed over to the free focus mode, the projection optical system drive unit 20 adjusts the projection optical system 17 to a predetermined position that is determined in advance.

The fifth embodiment of the present invention explained above provides the following beneficial operational effects. This projector 7 includes the light modulation element 16 that modulates the reproduced holographic optical image corresponding to the laser light emitted from the laser light source 11, and that emits the resulting optical image for projection. And the optical image for projection that is incident from the light modulation element 16 upon the projection optical system 17 is projected towards the screen. The projection mode selection unit 41 selects either the low speckle mode in which the focus depth of the projector 7 is shallow or the free focus mode in which its focus depth is deep, on the basis of whether or not the difference between the distances to the screen measured by each of the plurality of range finding units 105 is less than the predetermined value. When the projector 7 is to be set to the low speckle mode, then the projection mode selection unit 41 inserts the magnifying optical system 13 into the optical path of the collimated light, and thus magnifies the diameter of the ray bundle of the reproduced holographic optical image emitted from the holographic recording medium 14. Due to this, the incident numerical aperture of the reproduced holographic optical image that is incident upon the light modulation element 16 becomes relatively large, and the focus depth of the optical image for projection becomes relatively shallow. On the other hand, when the projector 7 is to be set to the free focus mode, then the projection mode selection unit 41 removes the magnifying optical system 13a from the optical path of the collimated light. Due to this, the incident numerical aperture of the reproduced holographic optical image that is incident upon the light modulation element 16 becomes smaller than in the low speckle mode, and the focus depth of the optical image for projection becomes relatively deep. Thus, according to the above procedure, it is possible for the projector 7 to change over between a plurality of focus modes whose focus depths are different, so that it is possible to cope with various different types of usage environment.

—A Sixth Embodiment—

A sixth embodiment of the present invention will now be explained. In the projector according to this sixth embodiment of the present invention, the projection mode changeover processing is different from that of the projectors 5 through 7 of the third through the fifth embodiments. The projector according to this sixth embodiment detects whether the surface of the screen is plane or is curved, and changes over the projection mode on the basis of the result of this detection. The state in which the surface of the screen is curved may, for example, be a state in which a cup or a circular cylinder or the like is used as a screen.

Figure 18:
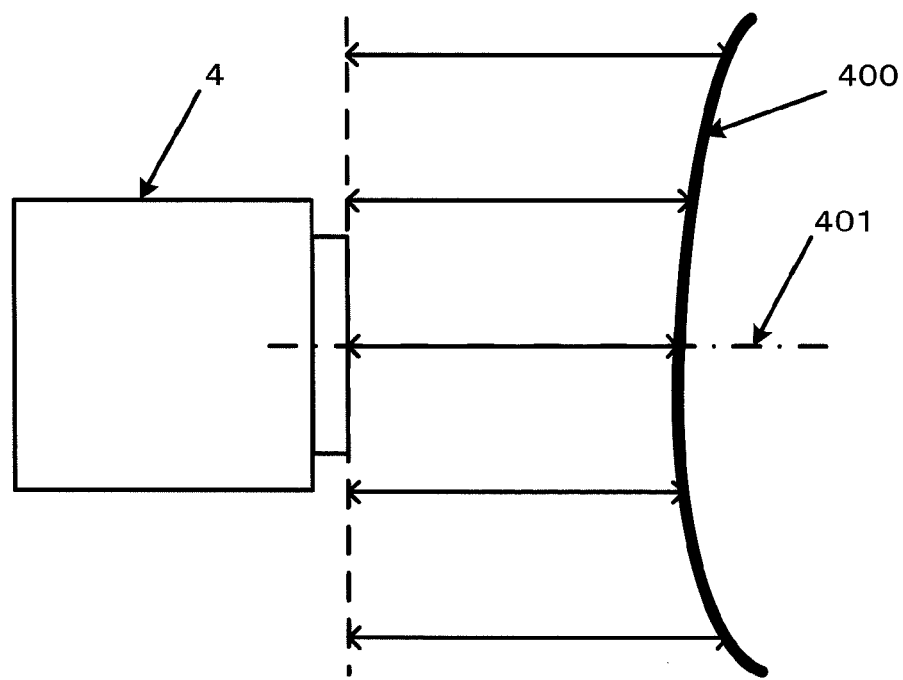
FIG. 18 is an example of a flow chart showing a processing flow for automatically changing over the focus depth of this projector according to a sixth embodiment of the present invention.

As shown in FIG. 18, the distance in the direction of projection 401 between a screen 400 whose surface is curved and the projector 8 according to the sixth embodiment of the present invention differs according to the position upon the screen 400. When the difference between the maximum value and the minimum value of the distance in the direction of projection 401 between the screen 400 and the projector 8 is greater than the focal depth of the projector 8, there is a fear that a portion of the image projected by the projector 8 may become blurred, and that an image of poor quality may be projected. Due to this, deterioration of the image quality is suppressed by the projector 8 using the free focus mode in which the focal depth is great when projecting an image upon the screen 400.

Figure 19:
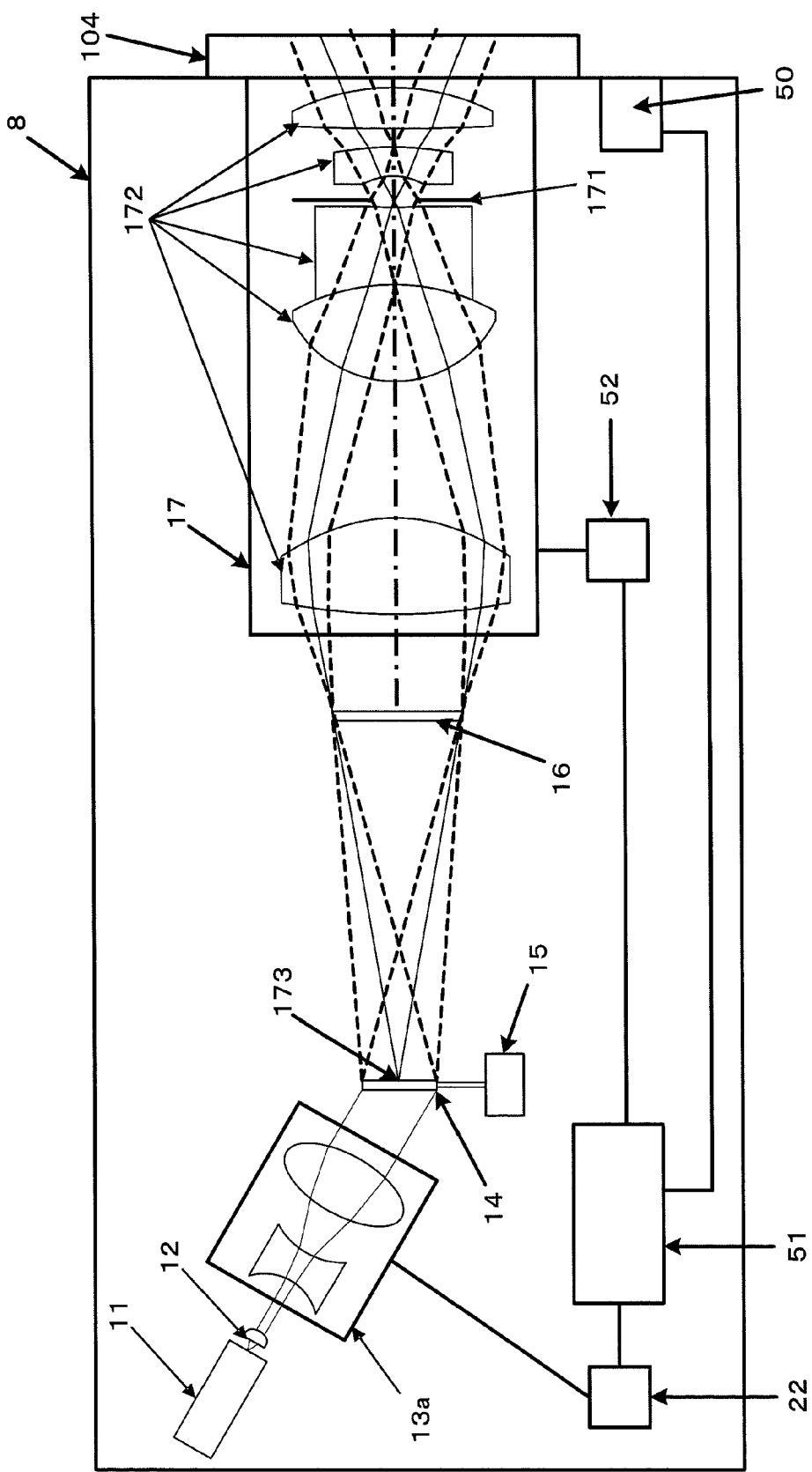
FIG. 19 is a schematic diagram showing an example of the internal structure of this projector according to the sixth embodiment of the present invention.

FIG. 19 is a block diagram showing an example of an internal construction for the projector 8. The projector 8 includes an image capturing unit 50, a projection mode selection unit 51, and a projection optical system drive unit 52. The image capturing unit 50 captures an image of the screen at a predetermined frame rate. And the image capturing unit 50 outputs the captured images of the screen to the projection mode selection unit 51.

The projection mode selection unit 51 includes a CPU, a RAM, a ROM and so on, and is connected to the image capturing unit 50, to the magnifying optical system drive unit 22, and to the projection optical system drive unit 52. And, on the basis of the captured image output by the image capturing unit 50, the projection mode selection unit 51 performs detection of the curved surface of the screen, focus detection processing for detecting the focal position of the projection optical system 18, and selection processing for the projection mode. The focus detection processing that is performed by the projection mode selection unit 51 may be performed using, for example, a per se known contrast AF type method. And the projection optical system drive unit 52 drives the projection optical system 18 to the focal position that has been detected by the projection mode selection unit 51.

Figure 20:
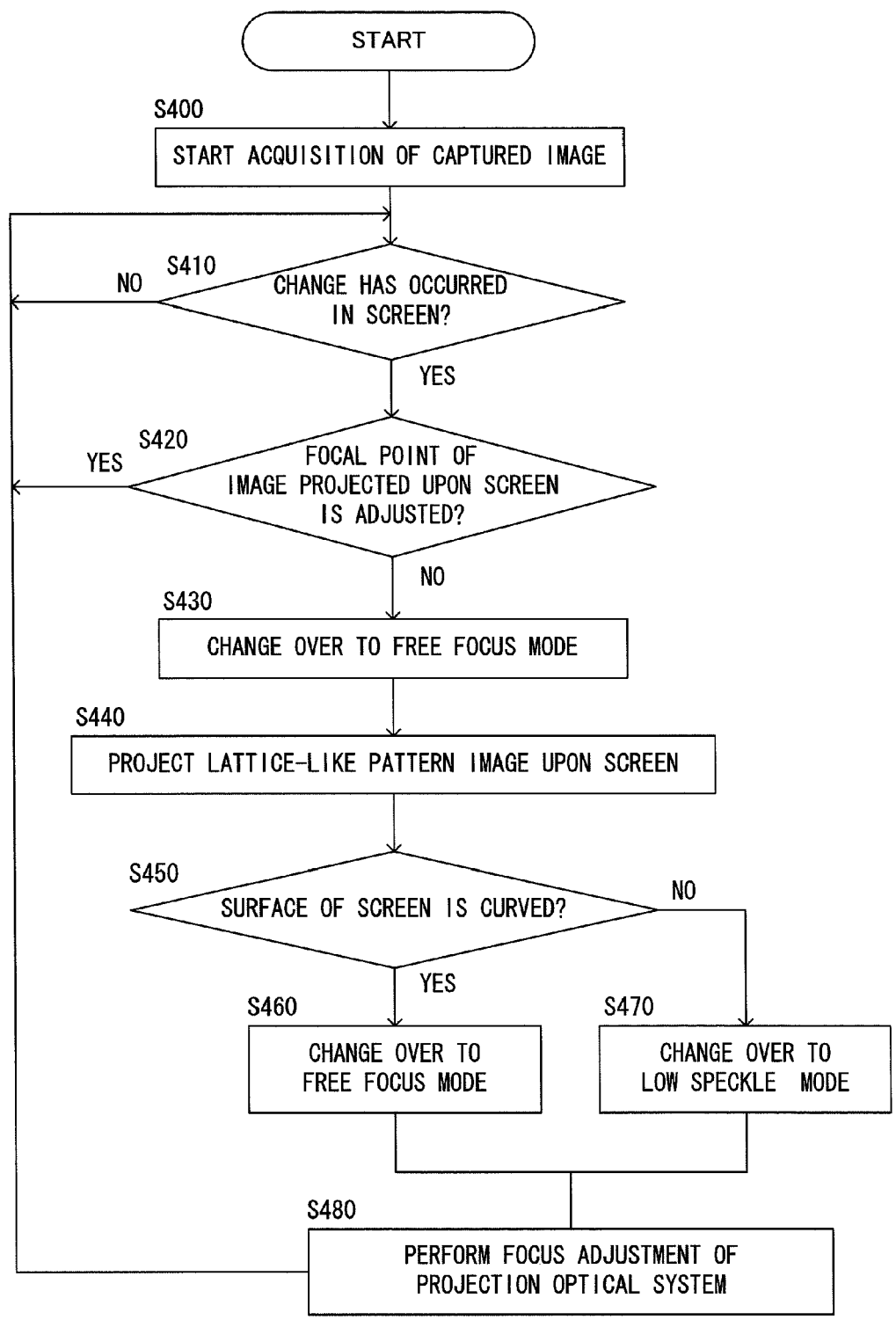
FIG. 20 is an example of a flow chart showing a processing flow for automatically changing over the focus depth of this projector according to the sixth embodiment of the present invention.

FIG. 20 is a flow chart related to the projection mode selection processing performed by the projection mode selection unit 51. In a step S400, the projection mode selection unit 51 starts acquisition from the image capturing unit 50 of a captured image related to the screen. Subsequently, for each frame, the projection mode selection unit 51 acquires a captured image related to the screen.

In a step S410, on the basis of the captured image for each frame acquired from the image capturing unit 50, the projection mode selection unit 51 makes a decision as to whether or not any change has occurred in the screen along with shifting of the projector 8 or the like. Details related to the processing in this step S410 will be described hereinafter. And, if an affirmative decision has been reached in this step S410, then the projection mode selection unit 51 transfers the flow of control to a step S420, while if a negative decision has been reached then the flow of control is transferred to a step S410.

In the step S420, on the basis of the captured image for each frame captured by the image capturing unit 50, the projection mode selection unit 51 makes a decision as to whether or not the focal point of the image projected upon the screen is properly adjusted. If an affirmative decision has been reached in this step S420 then the projection mode selection unit 51 transfers the flow of control to the step S410, whereas if a negative decision has been reached then the flow of control proceeds to a step S430.

Figure 21A:
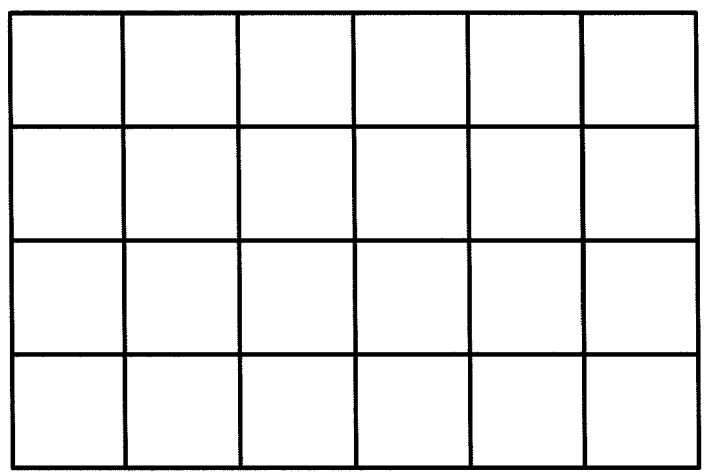
FIG. 21A is a figure for explanation of curved surface detection using a lattice pattern image.
Figure 21B:
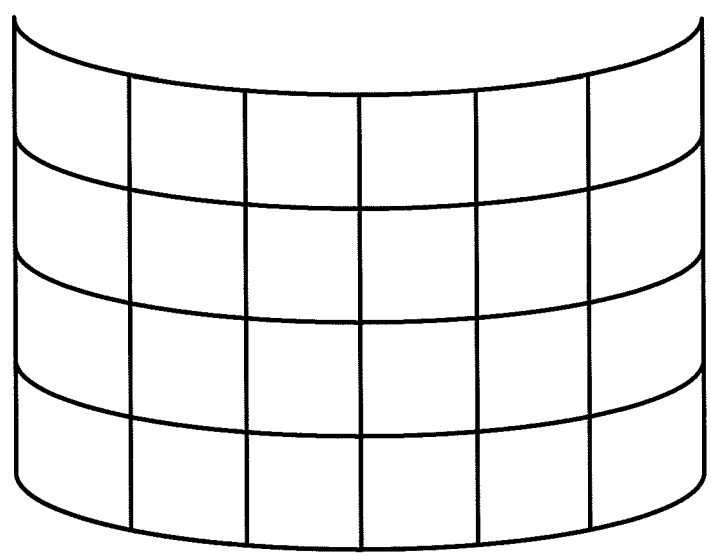
FIG. 21B is a figure for explanation of distorted lattice pattern.

In the step S430, the projection mode selection unit 51 changes over the projector 8 to the free focus mode. Then in a step S440 the projection mode selection unit 51 projects a lattice-like pattern image from the projection aperture 104, as shown by way of example in FIG. 21A. This lattice-like pattern image is stored in the ROM of the projection mode selection unit 51, or upon some other storage medium. Then in a step S450, on the basis of the deformation of the lattice pattern image included in the captured image, the projection mode selection unit 51 makes a decision as to whether or not the surface of the screen is curved. If the shape of this lattice is distorted by a predetermined amount or more (as for example shown in FIG. 21B), then the projection mode selection unit 51 decides that the surface of the screen is curved. If an affirmative decision has been reached in this step S450, then the projection mode selection unit 51 transfers the flow of control to a step S460, whereas if a negative decision has been reached then the flow of control is transferred to a step S470.

In the step S460, the projection mode selection unit 51 changes over the projector 8 to the free focus mode. And in the step S470, the projection mode selection unit 51 changes over the projector 8 to the low speckle mode. Then in a step S480 the projection mode selection unit 51 performs focus adjustment of the projection optical system 17 according to focus detection processing.

It should be understood that, if the user actuates the projection mode changeover switch 101 and changes over the projection mode of the projector 8, then the projection mode selection unit 51 prioritizes the projection mode to which the user has thus manually changed over, above the projection mode to which changeover is performed by the projection mode selection unit 15 using the processing described above.

Figure 22:
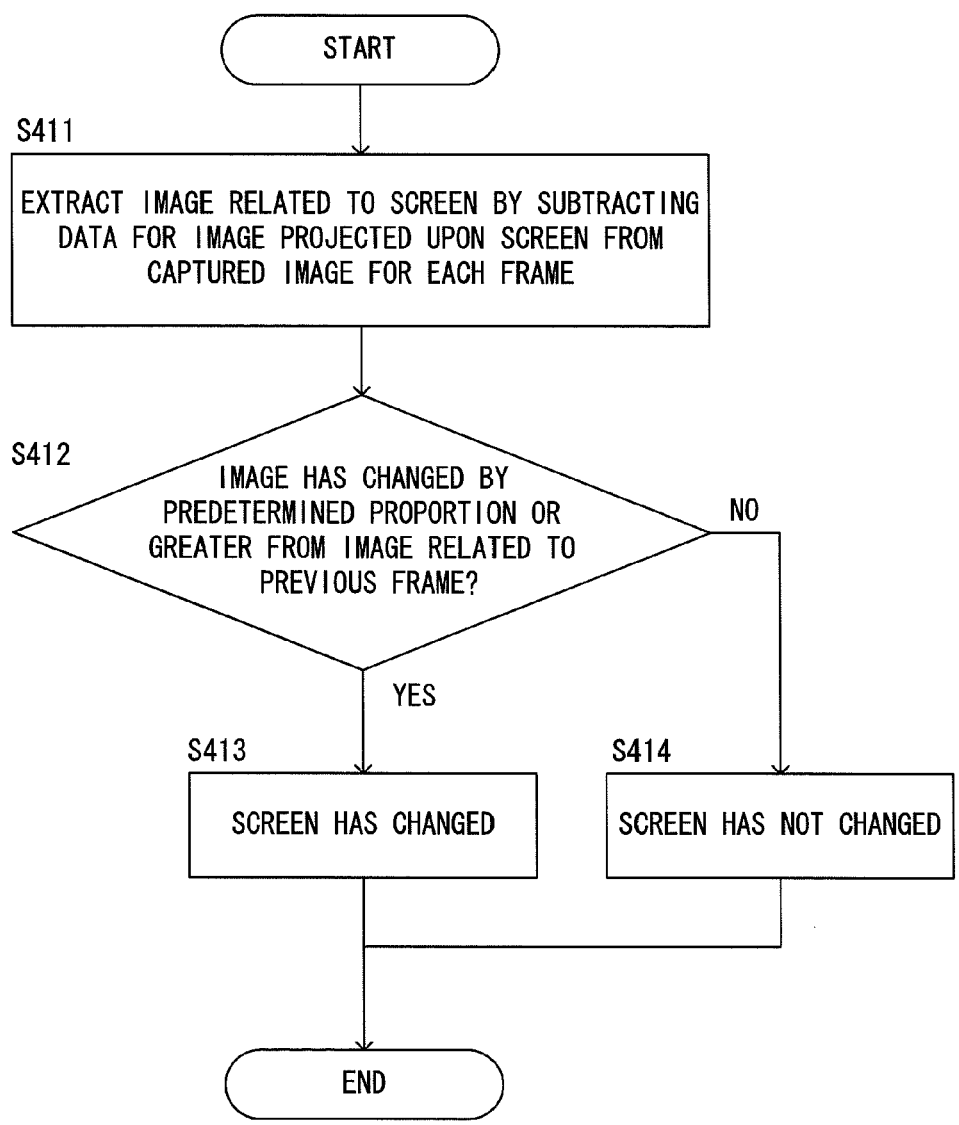
FIG. 22 is an example of a flow chart related to curved surface detection processing.
Figure 23:
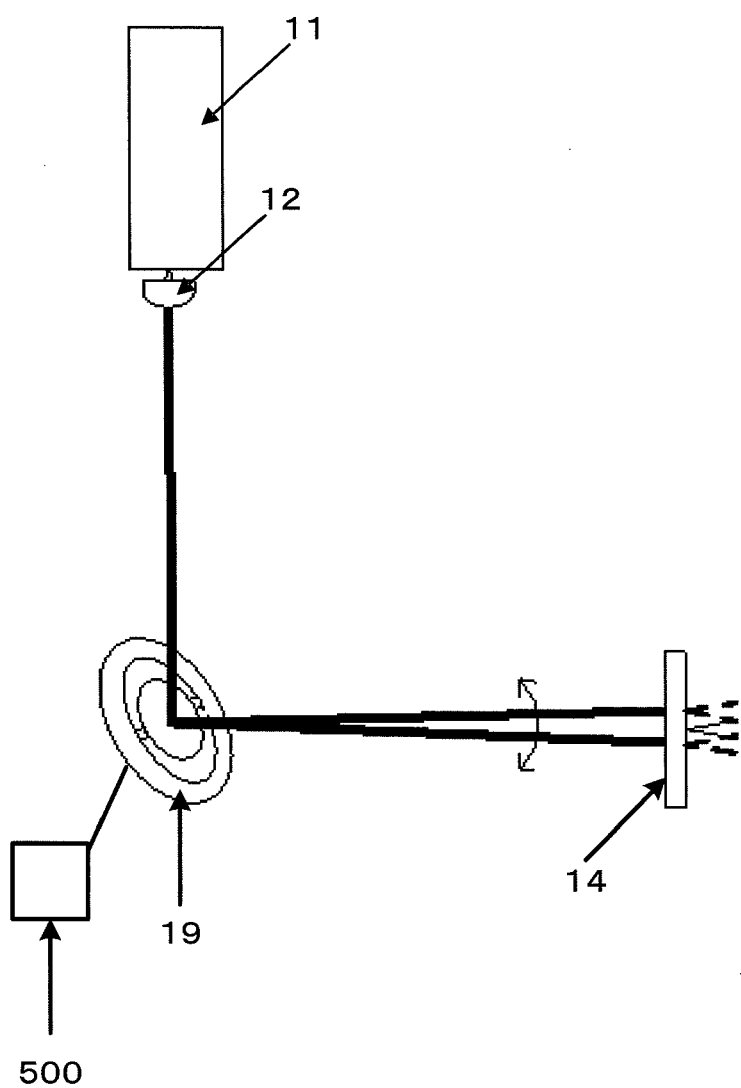
FIG. 23 is a figure showing a variant embodiment of the focus depth changeover method.

FIG. 22 is a flow chart related to the processing performed by the projection mode selection unit 51 in the step S410 of FIG. 20. In a step S411, using image processing, the projection mode selection unit 51 subtracts the image data for the image projected upon the screen from the captured image for each frame acquired from the image capturing unit 50. Due to this, an image related to the screen is extracted from the captured image for each frame.

Then in a step S412 the projection mode selection unit 51 compares together the image related to the screen that has been extracted in the step S411 and the image related to the previous frame, and makes a decision as to whether or not the image has changed by a predetermined proportion (for example 50%) or greater. And, if an affirmative result is reached in this step S412, then the projection mode selection unit 51 advances the flow of processing to a step S413, whereas if a negative decision has been reached, then the flow of processing is transferred to a step S414.

In the step S413, as the result of the decision in the step S410 of FIG. 20, it is determined that the screen has changed. On the other hand, in the step S414, as the result of the decision in the step S410 of FIG. 20, it is determined that the screen has not changed.

The sixth embodiment explained in the above provides the following beneficial operational effects. The projector 8 includes the light modulation element 16 that modulates a reproduced optical hologram image corresponding to the light emitted from the laser light source 11 and emits a projected optical image. And the projected optical image from the light modulation element 16 that is incident upon the projection optical system 17 is projected towards the screen. Moreover, on the basis of whether or not the surface of the screen is curved, the projection mode selection unit 51 selects whether to set the low speckle mode in which the focal depth of the projector 8 is shallow, or the free focus mode in which the focal depth is deep. When the projector 8 is to be set to the low speckle mode, the projection mode selection unit 51 inserts the magnification optical system 13*a* into the optical path of the collimated light, thus increasing the diameter of the ray bundle of the reproduced optical holograph image emitted from the hologram recording medium 14. Due to this, the incident numerical aperture of the reproduced optical hologram image that is incident upon the light modulation element 16 becomes large, so that the focal depth of the projected optical image becomes shallow. Moreover, when the projector 8 is to be set to the free focus mode, the projection mode selection unit 51 removes the magnification optical system 13*a* from the optical path of the collimated light. Due to this, the incident numerical aperture of the reproduced optical hologram image that is incident upon the light modulation element 16 becomes smaller than in the low speckle mode, so that the focal depth of the projected optical image becomes deep. And, due to this, the projector 8 is able to deal with various types of usage environment, since it is able to employ a plurality of projection methods whose focal depths are different by changing over between them. In particular, by the projector 8 detecting the fact that the screen has a curved surface and changing the focal depth on the basis of the result of this detection, it is possible for the projector to deal with the case of projection upon a screen having a curved surface, such as a cup or a circular cylinder or the like.

The embodiments third through sixth explained above may be implemented in various altered ways, as below.

(1) In the embodiments third to sixth described above, when the user actuates the projection mode changeover switch 101 and changes over the projection mode of any one of the projectors 5 through 8 manually, the projection mode to which the user has changed over manually is given priority over the projection mode to which the projection mode selection unit 21, 31, 41, or 51 has changed over. However, conversely, it would also be acceptable to arrange to prioritize the projection mode to which the projection mode selection unit 21, 31, 41, or 51 has changed over, over the projection mode to which the user has changed over manually. Moreover, it would also be acceptable to arrange for it to be possible to set which of these projection modes should be prioritized by using the confirm switch 102 and the selection switch 103.

(2) In FIGS. 11, 13, and 17, when the projection mode selection unit 21, 31, 41, or 51 selected the projection mode, the projection mode of the projector was changed over without the magnifying optical system drive unit 22 checking with the user whether or not the changeover was to be made. However it would also be acceptable, after the calculation unit of the projection mode selection unit 21, 31, 41, or 51 has selected a new projection mode, to arrange only to change over the projection mode of the projector 5, 6, 7, or 8, after a check has been made with the user as to whether or not the projection mode of the projector is actually to be changed over. Moreover, it would also be acceptable to arrange for the projection mode of the projector 5, 6, 7, or 8 not to be changed over automatically by the magnifying optical system drive unit 22, but rather to display a predetermined message upon the screen inviting the user to change over to the projection mode that the projection mode selection unit 21, 31, 41, or 51 has selected, so as to incite the user to change over the projection mode manually with the projection mode changeover switch 101.

(3) The projectors 5 through 8 change over between the low speckle mode and the free focus mode by inserting and removing a single magnifying optical system 13a. However, it would also be acceptable to arrange for any one of these projectors 5 through 8 to be provided with a plurality of magnifying optical systems that provide different magnifications for the diameter of the ray bundle. Moreover, it would also be acceptable additionally to provide one or more reduction optical systems that reduce the diameter of the ray bundle. And it would be acceptable to arrange for it to be possible to project the optical image for projection with different focus depths in the low speckle mode and in the free focus mode by using this plurality of magnifying optical systems and reducing optical systems.

Yet further, the means for changing over the projection mode of the projectors 5 through 8 is not to be considered to be limited to inserting and/or removing a magnifying optical system and/or a reduction optical system. For example, it would also be acceptable to exchange the magnifying optical system 13a for a scanning optical system such as a MEMS mirror or a Galvano mirror or the like, and to exchange the magnifying optical system drive unit 22 for a scanning optical system drive unit that changes the angle of the scanning optical system cyclically. At this time, the collimated light emitted from the condensing optical system 12 is reflected by the scanning optical system towards the holographic recording medium 14 as laser light for reproduction. The projection mode selection unit 21, 31, 41, or 51 commands the scanning optical system drive unit 500 to provide a certain angle of oscillation, and controls the region of the holographic recording medium 14 that receives the laser light for reproduction. During the low speckle mode the angle of oscillation of the scanning optical system 19 is controlled so that it becomes large, while in the free focus mode angle of oscillation of the scanning optical system 19 is controlled so that it becomes small.

(4) While in the above it was arranged for the holographic recording medium 14 to be of a type that records a transmission type hologram, it would also be acceptable to arrange for it to be of a type that records a reflective type hologram. Moreover, while in the above a transmission type spatial light modulator was used as the light modulation element 16, it would also be acceptable to utilize a reflective type light modulation element, such as an LCOS (Liquid Crystal on Silicon) type device or a DMD (Digital Mirror Device) or the like. Furthermore, it would also be acceptable to arrange to change the holographic recording medium to a micro lens that transmits collimated light.

(5) It would also be acceptable for the plurality of range finding units 105 provided to the projector 7 to be replaced by a stereo camera. And it might be arranged for the projection mode selection unit 41 of the projector 7 to make the decision in the step S300 of FIG. 10 on the basis of depth information for the screen acquired from the stereo camera. Moreover, the image capturing unit 50 of the projector 8 may also be replaced by a stereo camera. In this case, the projection mode selection unit 51 of the projector 8 would make the decision as to whether or not the screen has a curved surface, on the basis of depth information for the screen acquired from the stereo camera.

Figure 24:
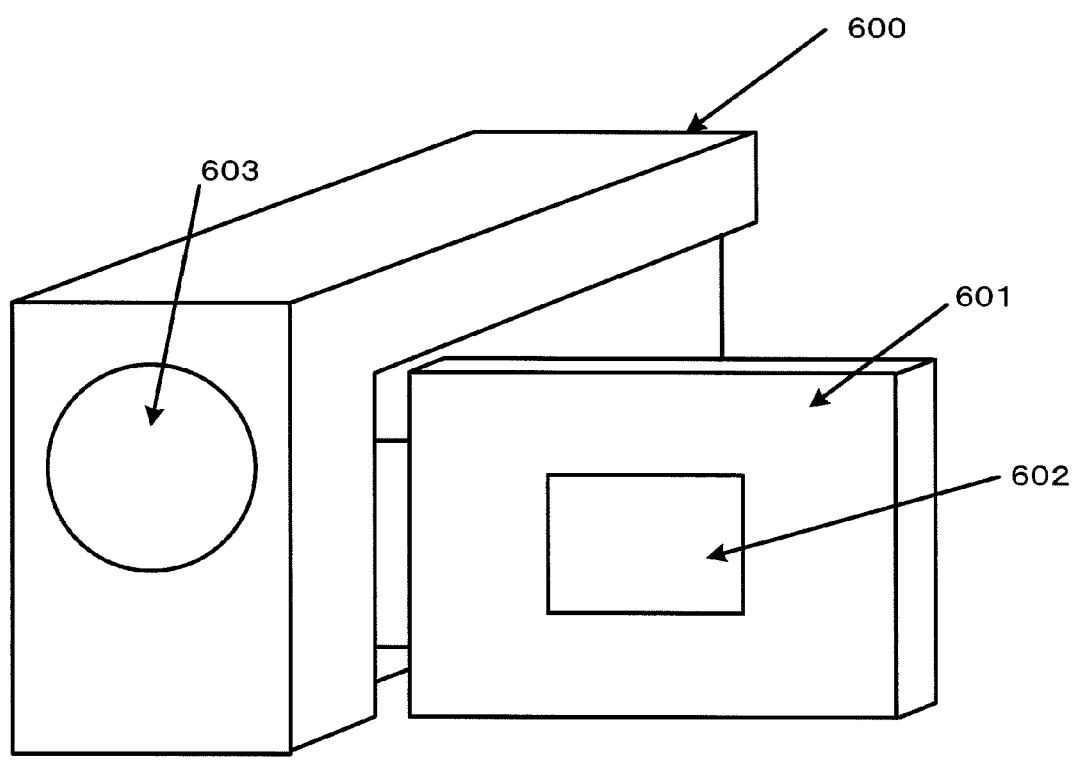
FIG. 24 is a figure showing the external shape of a video camera that is equipped with a projector according to the present invention.

(6) The present invention may also be applied to a camera provided with a projector, to a video camera provided with a projector, to a portable telephone provided with a projector, or the like. FIG. 24 is an example of a video camera provided with a projector. The video camera 600 provided with a projector shown in FIG. 24 is provided with a projection unit 602 for projecting onto the rear surface of a variable angle monitor 601. Using this image capturing unit 602 and projection unit 602, the video camera 600 provided with a projector is able to perform processing similar to that of the projector 8 of the sixth embodiment of the present invention. For example, it may be arranged for the video camera 600 equipped with a projector to capture a lattice-like pattern image projected by the projection unit 602 with the image capturing unit 603, and to detect that the screen is a curved surface on the basis of the result of this image capture. and, when the video camera 600 equipped with a projector detects that the screen is a curved surface, then it may perform projection according to the free focus mode.

Furthermore, if the camera equipped with a projector and the video camera equipped with a projector to which the present invention has been applied are provided with a camera shake correction function, then it would also be acceptable to arrange to utilize an angular velocity sensor or the like that is for detecting camera shaking as one of the types of sensor 23 for the projector.

Furthermore, with a camera equipped with a projector, a video camera equipped with a projector, a portable telephone equipped with a projector, or the like, it would also be acceptable to arrange to detect the fact that the device has been installed in a cradle. And it would be acceptable, if it has been detected that this electronic device to which a projector is mounted has been installed in a cradle, to arrange for it to be determined that the device is in the stationary state, and to change over to the low speckle mode. It should be understood that the detection of the fact that the device is installed in a cradle may be performed by receiving a predetermined signal from the cradle.

(7) With the projector 8 of the sixth embodiment or with a projector provided with an image capturing unit such as the video camera 600 equipped with a projector of FIG. 24, it would also be acceptable to analyze the image output from the image capturing unit and captured, and to make a decision as to whether or not this projector is in the stationary state. For example, it may be decided that the projector is in the stationary state if the image of the photographic subject that has been captured does not change over longer than some predetermined time period. And the system may change over to the low speckle mode if, upon analysis of the captured image, it has been determined that the projector is in the stationary state.

In the step S440 of FIG. 20, in order to make the decision as to whether or not the screen is a curved surface, the projector 8 according to the sixth embodiment projects an image of a lattice pattern upon the screen. However, a lattice-like pattern image may also be employed for some purpose other than detecting that the screen is a curved surface. For example, it may be employed for detecting that the screen is tilted, as shown in FIG. 16. Moreover, the pattern image that is projected in order to detect that the screen is a curved surface is not limited to the one in FIG. 21A.

The various embodiments and variant embodiments explained above are only given by way of example; the present invention is not to be considered as being limited by the details thereof, provided that the essence of the invention is not lost. Furthermore, within the range in which the essence of the invention is not lost, the various embodiments and variant embodiments may also be employed in any appropriate combination.

What is claimed is:

1. A projector, comprising:
 a laser light source that emits laser light;
 a condensing optical system that collimates the laser light;
 a holographic recording medium that, when the laser light is incident thereupon for reproduction, emits a reproduced holographic optical image on the basis of a holographic image;
 a light modulation element that modulates the reproduced holographic image and emits an optical image for projection;
 a projection optical system that projects the optical image for projection; and
 a focus depth adjustment unit that adjusts a focus depth of the laser light projected by the projection optical system by adjusting a beam diameter of the laser light.

2. A projector according to claim 1, wherein the projection optical system has an entrance pupil at a position that approximately coincides with the position of the exit surface where the holographic recording medium emits the reproduced holographic optical image.

3. A projector according to claim 2, wherein the projection optical system has an entrance pupil radius such that it is capable of projecting, with no vignetting, the optical image for projection corresponding to the reproduced holographic optical image emitted from the entire area of the holographic recording medium.

4. A projector according to claim 1, wherein the reproduced holographic optical image is capable of irradiating the entire area of an image display region.

5. A projector according to claim 1, further comprising a vibration element that vibrates the holographic recording medium, thereby reducing speckle noise.

6. An image capturing apparatus, comprising a projector according to claim 1.

7. A projector, comprising:
 a laser light source that emits laser light;
 a condensing optical system that collimates the laser light;
 a holographic recording medium that, when the laser light is incident thereupon for reproduction, emits a reproduced holographic optical image on the basis of a holographic image;
 a light modulation element that modulates the reproduced holographic image and emits an optical image for projection;
 a projection optical system that projects the optical image for projection; and
 a focus depth adjustment unit that adjusts a focus depth of the laser light projected by the projection optical system by adjusting a beam diameter of the laser light,
 wherein the focus depth adjustment unit comprises a magnifying optical system that is capable of increasing the beam diameter of the laser light collimated by the condensing optical system, and the projection numerical aperture of the reproduced holographic optical image is adjusted by inserting and removing the magnifying optical system into and from the optical path of the laser light collimated by the condensing optical system.

8. A projector according to claim 7, wherein the focus depth adjustment unit further comprises a reduction optical system that is capable of reducing the beam diameter of the laser light collimated by the condensing optical system, and the reduction optical system is inserted into the optical path of the laser light collimated by the condensing optical system when the magnifying optical system has been removed from that optical path.

9. A projector, comprising:
 a laser light source that emits laser light;
 a condensing optical system that collimates the laser light;
 a holographic recording medium that, when the laser light is incident thereupon for reproduction, emits a reproduced holographic optical image on the basis of a holographic image;
 a light modulation element that modulates the reproduced holographic image and emits an optical image for projection;
 a projection optical system that projects the optical image for projection; and
 a focus depth adjustment unit that adjusts a focus depth of the laser light projected by the projection optical system by adjusting a beam diameter of the laser light,
 wherein the focus depth adjustment unit comprises an iris member at the light source side of the holographic recording medium or at its rear surface side, and the projection numerical aperture of the reproduced holographic optical image is adjusted by reducing the diameter of the reproduced holographic optical image in correspondence with the beam diameter of the laser light for reproduction.

10. A projector comprising:
 a laser light source that emits laser light;
 a condensing optical system that collimates the laser light;
 a holographic recording medium that, when the laser light is incident thereupon for reproduction, emits a reproduced holographic optical image on the basis of a holographic image;
 a light modulation element that modulates the reproduced holographic image and emits an optical image for projection;
 a projection optical system that projects the optical image for projection; and
 a focus depth adjustment unit that adjusts a focus depth of the laser light projected by the projection optical system by adjusting a beam diameter of the laser light, wherein the focus depth adjustment unit comprises a scanning optical system that scans the holographic recording medium with a reflected light beam consisting of laser light collimated by the condensing optical system and reflected, and the projection numerical aperture of the reproduced holographic optical image is adjusted by adjusting the angular range over which the reflected light beam is reflected when the scanning optical system scans the holographic recording medium.

11. A projector according to claim 10, wherein the scanning optical system is a MEMS mirror.

12. A projector, comprising:
a laser light source that emits laser light;
a condensing optical system that collimates the laser light;
a holographic recording medium that, when the laser light is incident thereupon for reproduction, emits a reproduced holographic optical image on the basis of a holographic image;
a light modulation element that modulates the reproduced holographic image and emits an optical image for projection; and
a projection optical system that projects the optical image for projection;
wherein the projection optical system has an entrance pupil at a position that approximately coincides with a position of an exit surface where the holographic recording medium emits the reproduced holographic optical image, and
wherein the projection optical system forms a real image of an aperture iris included in the projection optical system at the postion of the entrance pupil.

13. A projector according to claim 12, wherein the projection optical system has an entrance pupil such that it is capable of projecting, with no vignetting, the optical image for projection corresponding to the reproduced holographic optical image emitted from an entire area upon which the holographic image is recorded in the holographic recording medium.

14. A projector, comprising:
a laser light source that emits laser light;
a condensing optical system that collimates the laser light;
a holographic recording medium that, when the laser light is incident thereupon for reproduction, emits a reproduced holographic optical image on the basis of a holographic image;
a light modulation element that modulates the reproduced holographic image and emits an optical image for projection;
a projection optical system that projects the optical image for projection; and
a focus depth adjustment unit that adjusts a focus depth of the laser light projected by the projection optical system by adjusting a beam diameter of the laser light,
wherein the focus depth adjustment unit is set between the laser light source and the holographic recording medium or between the holographic recording medium and the light modulation element.

* * * * *